United States Patent [19]
Cummings

[11] Patent Number: 4,816,629
[45] Date of Patent: Mar. 28, 1989

[54] SNAP-ACTION ELECTRICAL SWITCH FOR AUTOMOTIVE AIR CONTROL UNITS

[75] Inventor: John G. Cummings, Cary, Ill.

[73] Assignee: Indak Manufacturing Corp., Northbrook, Ill.

[21] Appl. No.: 116,060

[22] Filed: Oct. 29, 1987

Related U.S. Application Data

[62] Division of Ser. No. 930,000, Nov. 10, 1986, Pat. No. 4,720,612.

[51] Int. Cl.$^4$ .............................................. H01H 21/00
[52] U.S. Cl. .................................................... 200/438
[58] Field of Search ........... 200/6 R, 5 R, 6 B, 6 BA, 200/6 BB, 16 C, 16 D, 67 R, 68.1, 68.2, 68.3, 76

[56] References Cited

U.S. PATENT DOCUMENTS

| | | | |
|---|---|---|---|
| 3,999,024 | 12/1976 | Marquardt | 200/68.2 |
| 4,117,286 | 9/1978 | Methner et al. | 200/76 |
| 4,147,908 | 4/1979 | Swann | 200/68.3 X |

*Primary Examiner*—J. R. Scott
*Attorney, Agent, or Firm*—Burmeister, York, Palmatier, Hamby & Jones

[57] ABSTRACT

The disclosed pushbutton operated automotive air control unit incorporates a unique snap-action electrical switch in which the movable contactor has a combination of sliding and rocking movement. The contactor is rockably supported on a fulcrum member which is movably mounted on the slidable carriage. The fulcrum member includes a locating projection, loosely received in a slot formed in the contactor. A coil spring is interposed between the carriage and the fulcrum member for biasing the contactor toward a first fixed contact. There is also a second fixed contact having contactor rocking lugs for slidably engaging the contactor, as the carriage is moved between first and second positions. In the first position, the lugs engage a portion of the contactor which is on the remote side of the fulcrum member from the first fixed contact, whereby the contactor is rocked into electrical engagement with the first fixed contact. The movement of the carriage to its second position causes movement of the contactor relative to the lugs until the fulcrum member passes the lugs whereby the contactor is abruptly rocked out of engagement with the first fixed contact, thus affording a snap action.

8 Claims, 19 Drawing Sheets

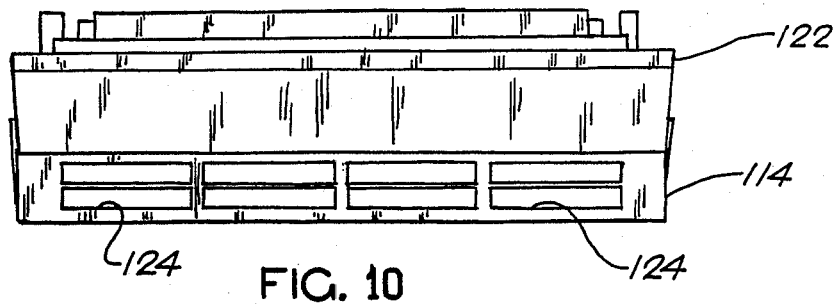
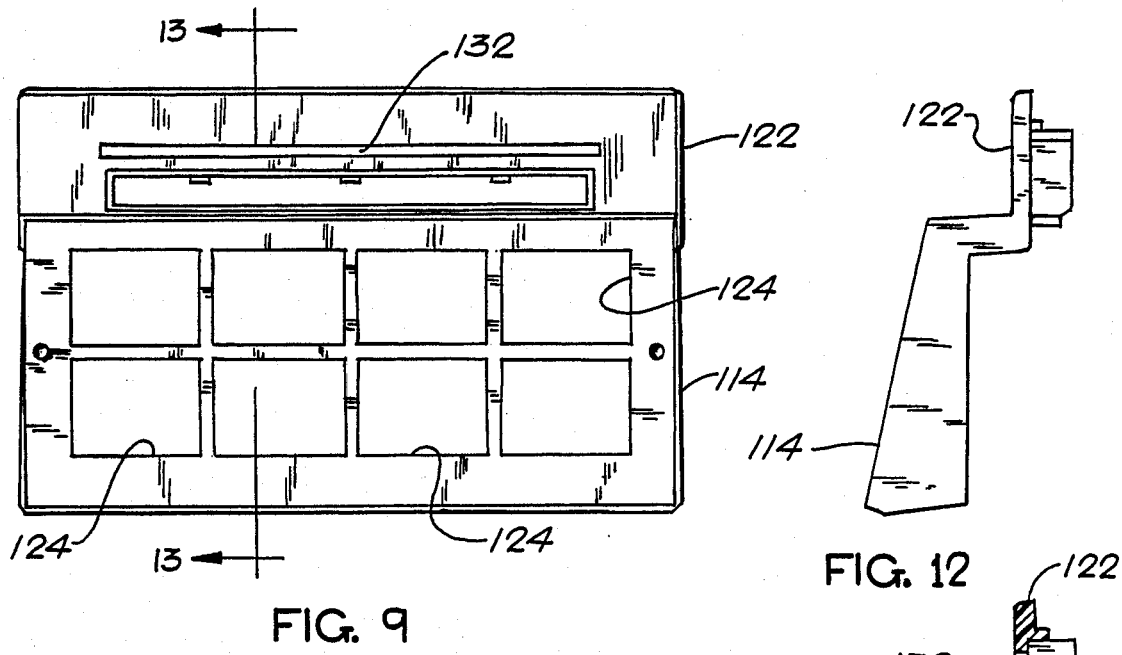
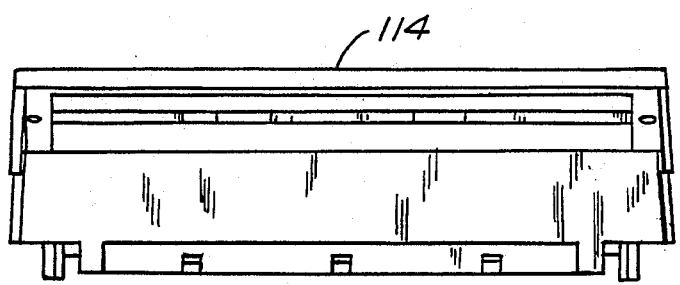
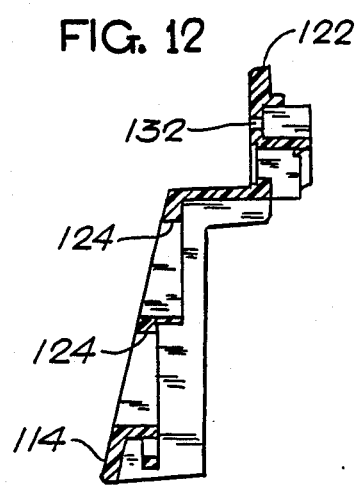
FIG. 10
FIG. 9
FIG. 11
FIG. 12
FIG. 13

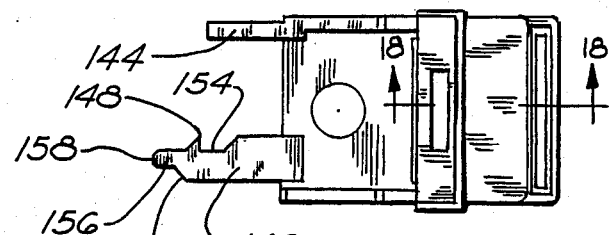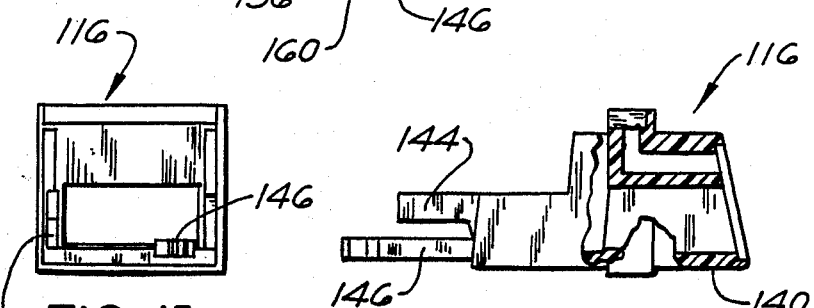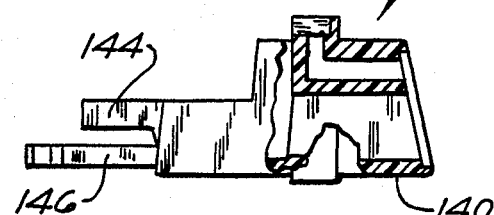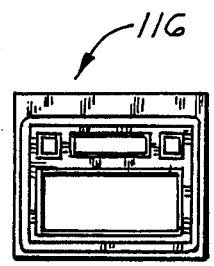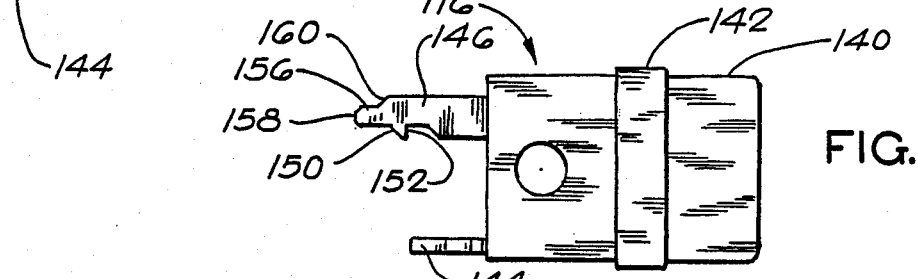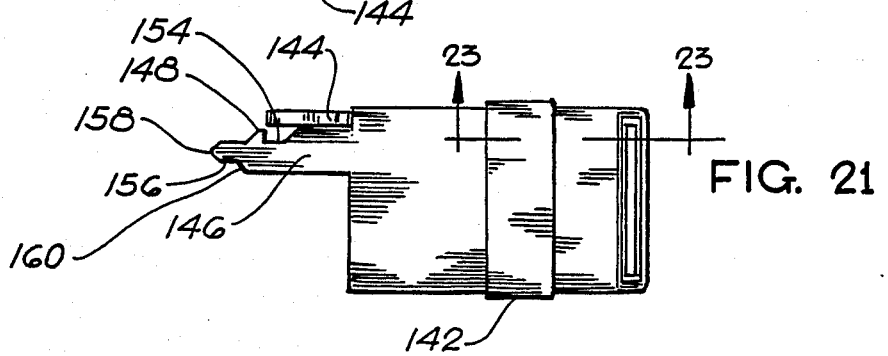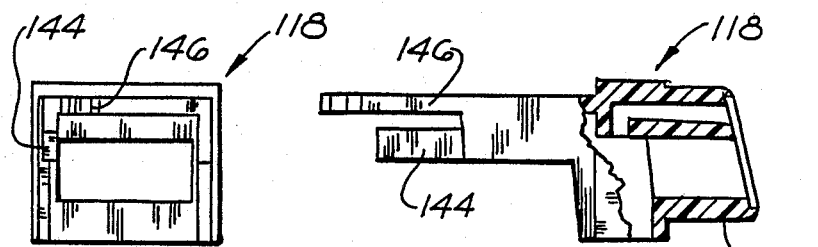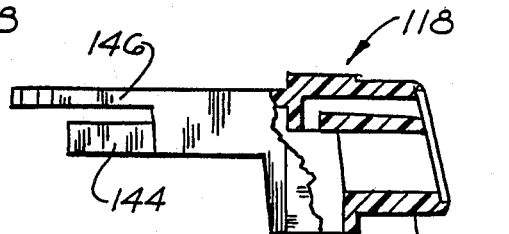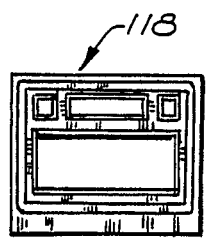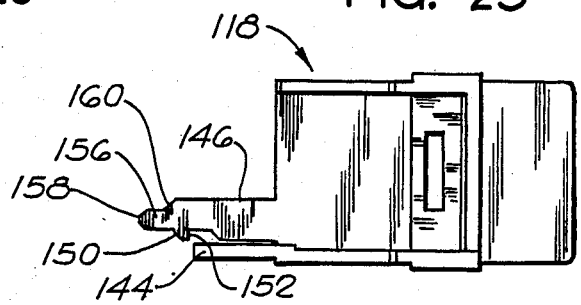

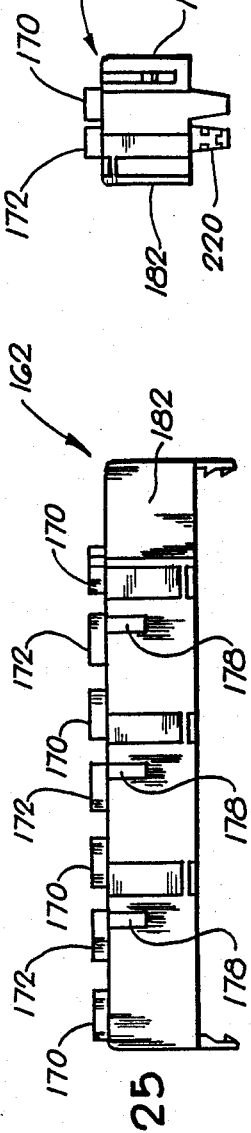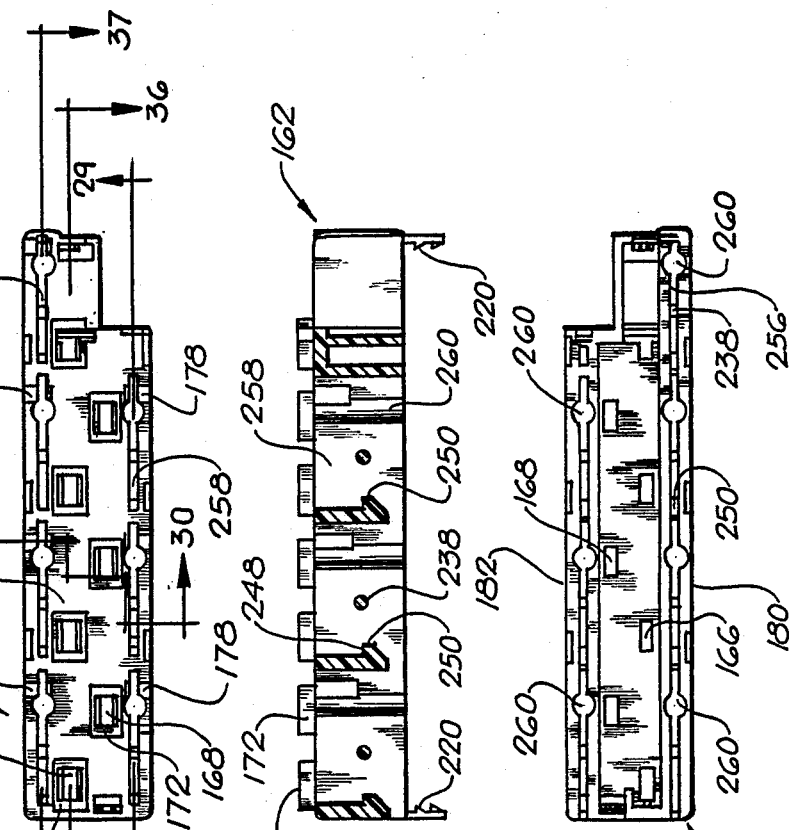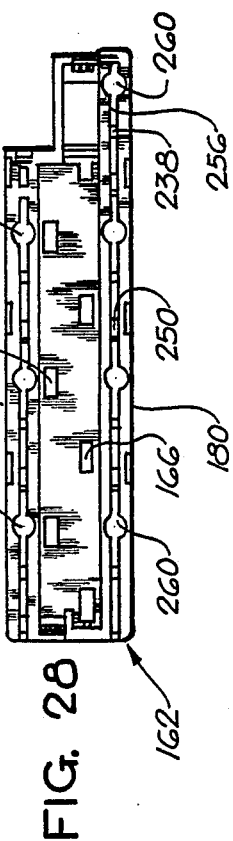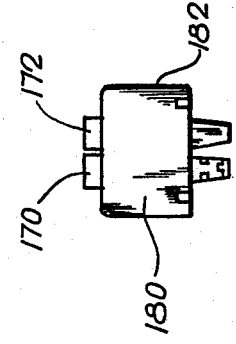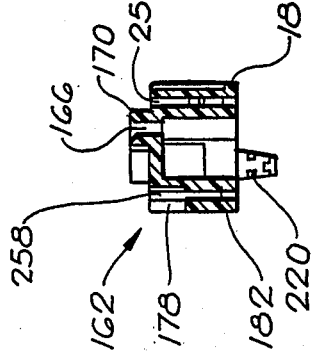

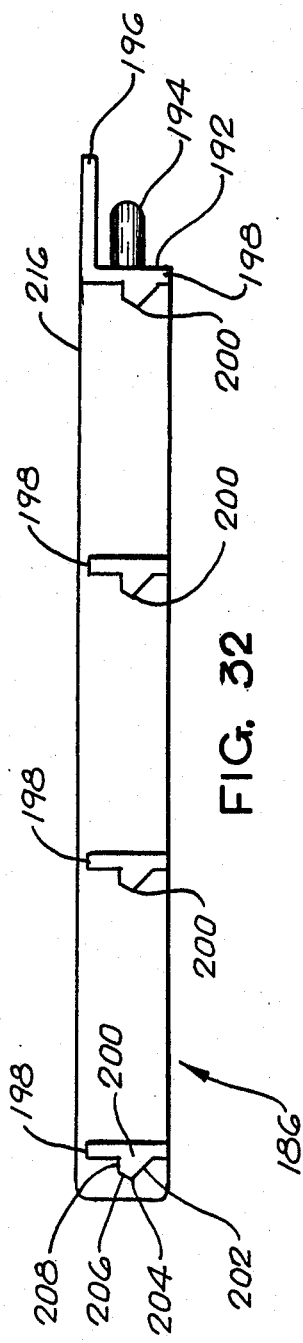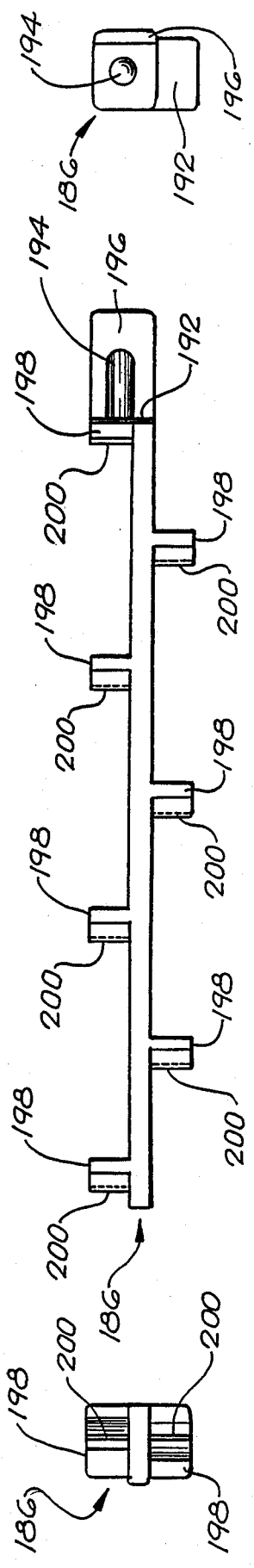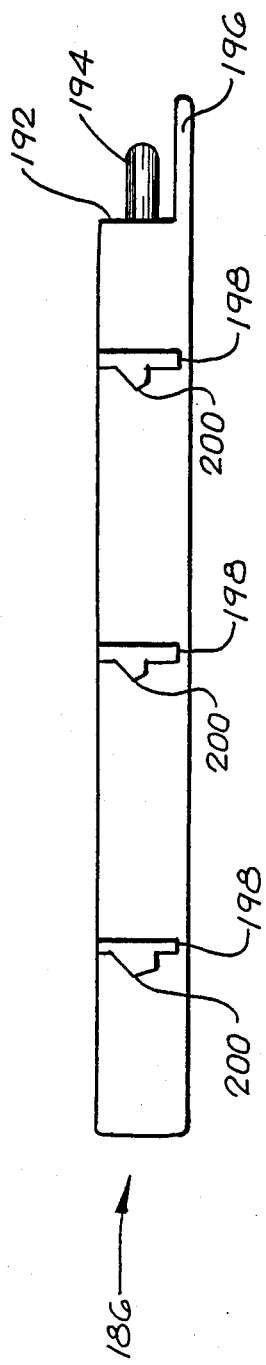

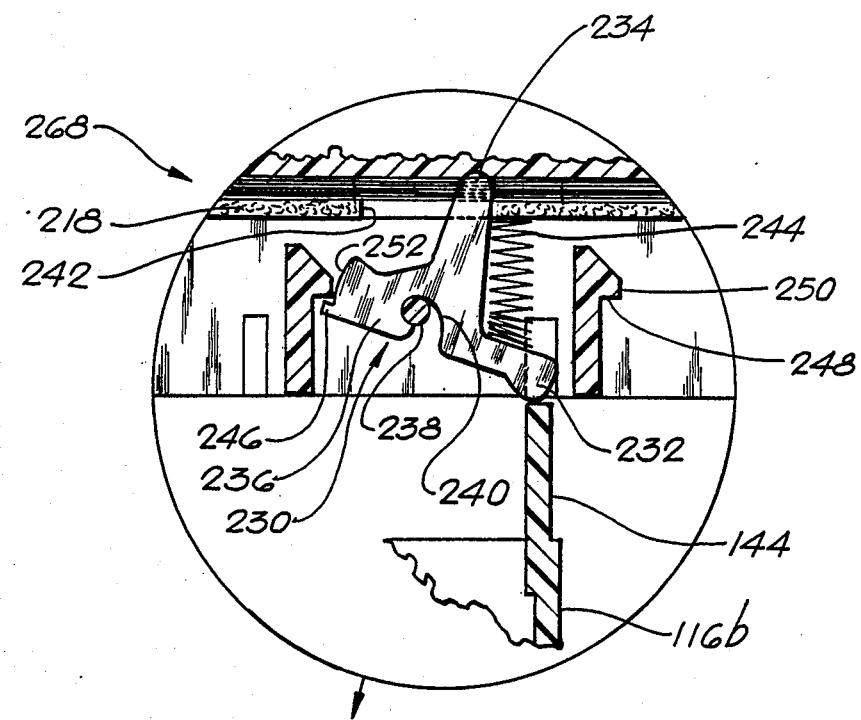
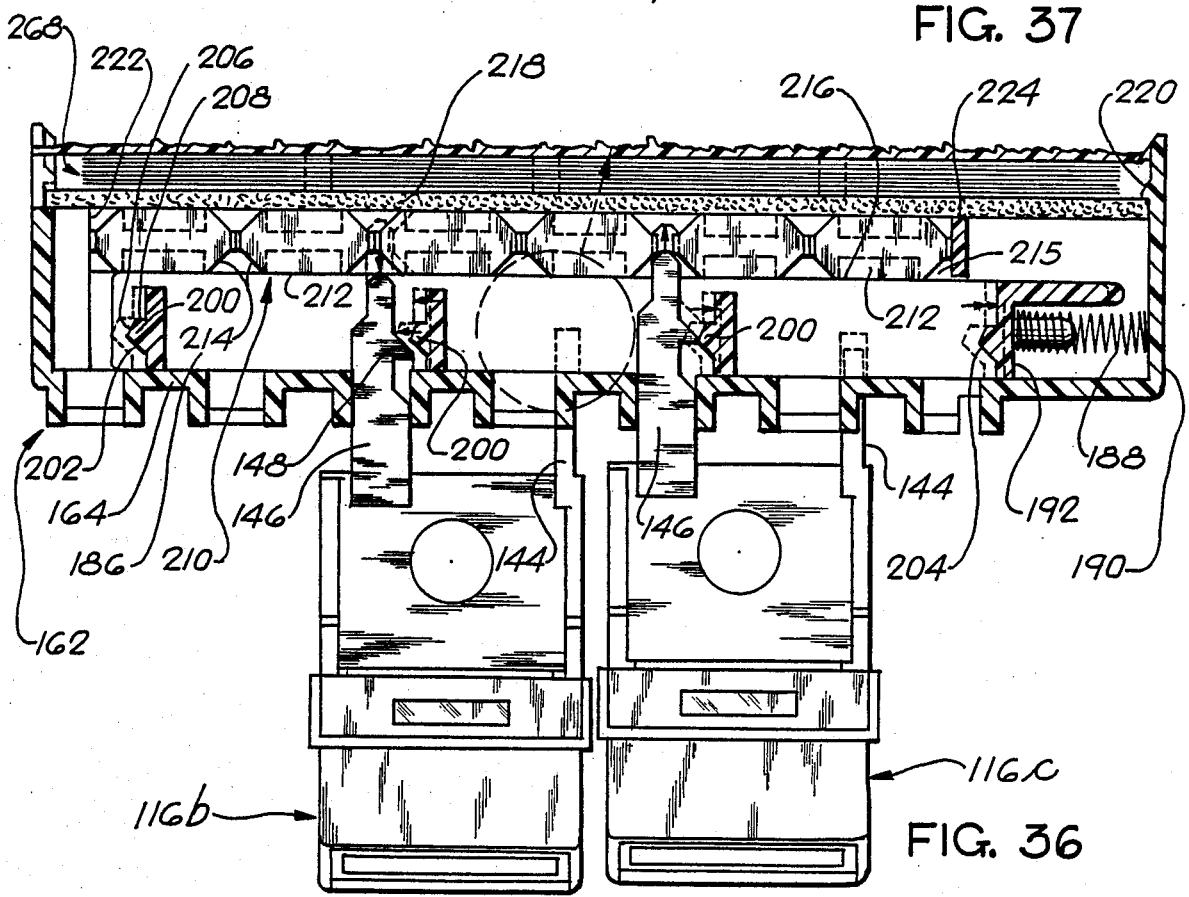
FIG. 37
FIG. 36

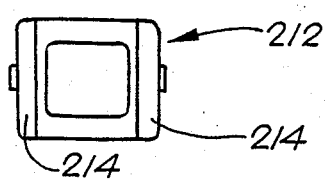
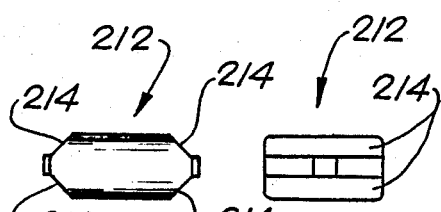
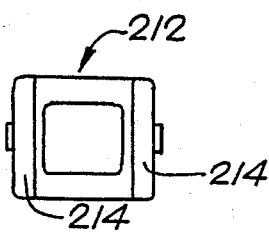
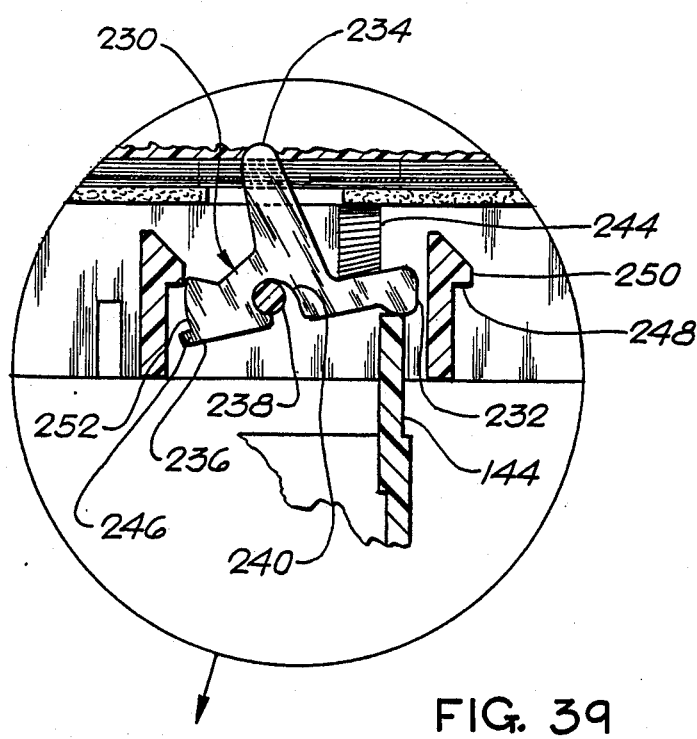
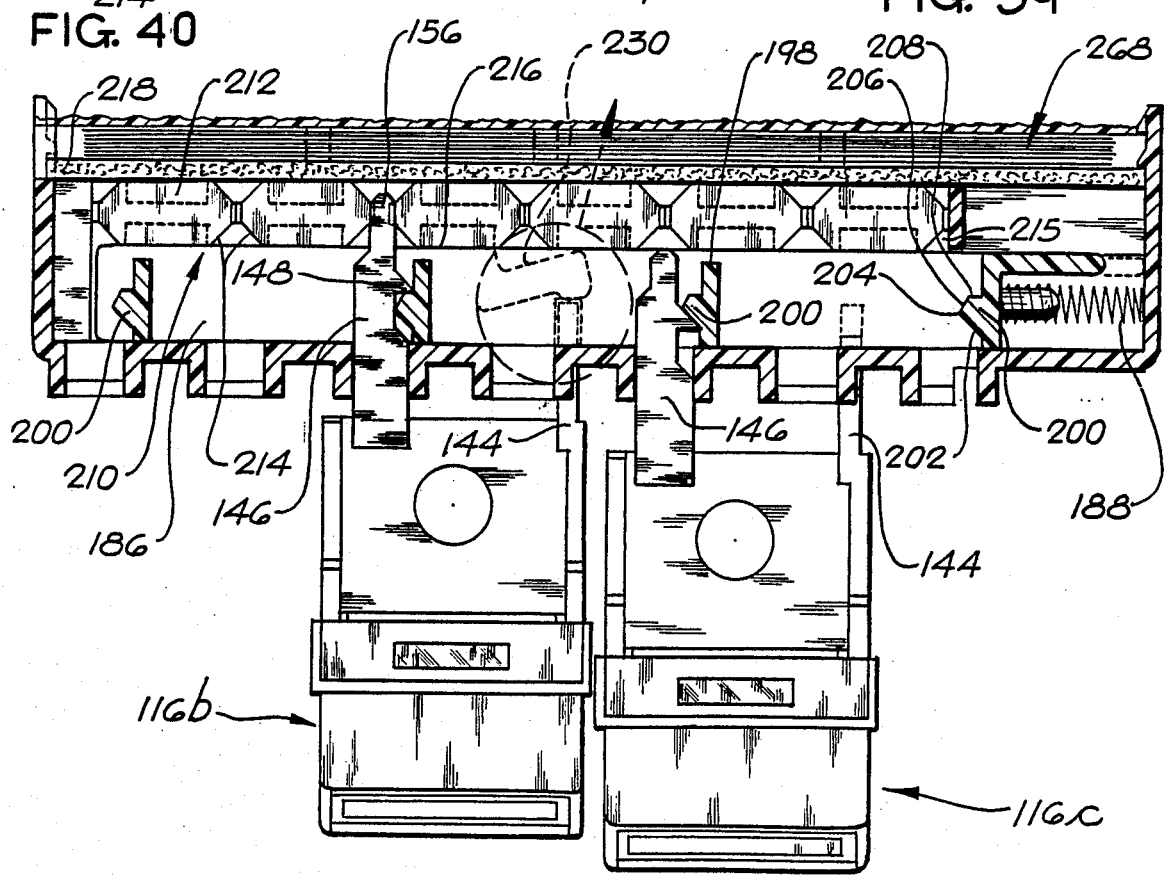

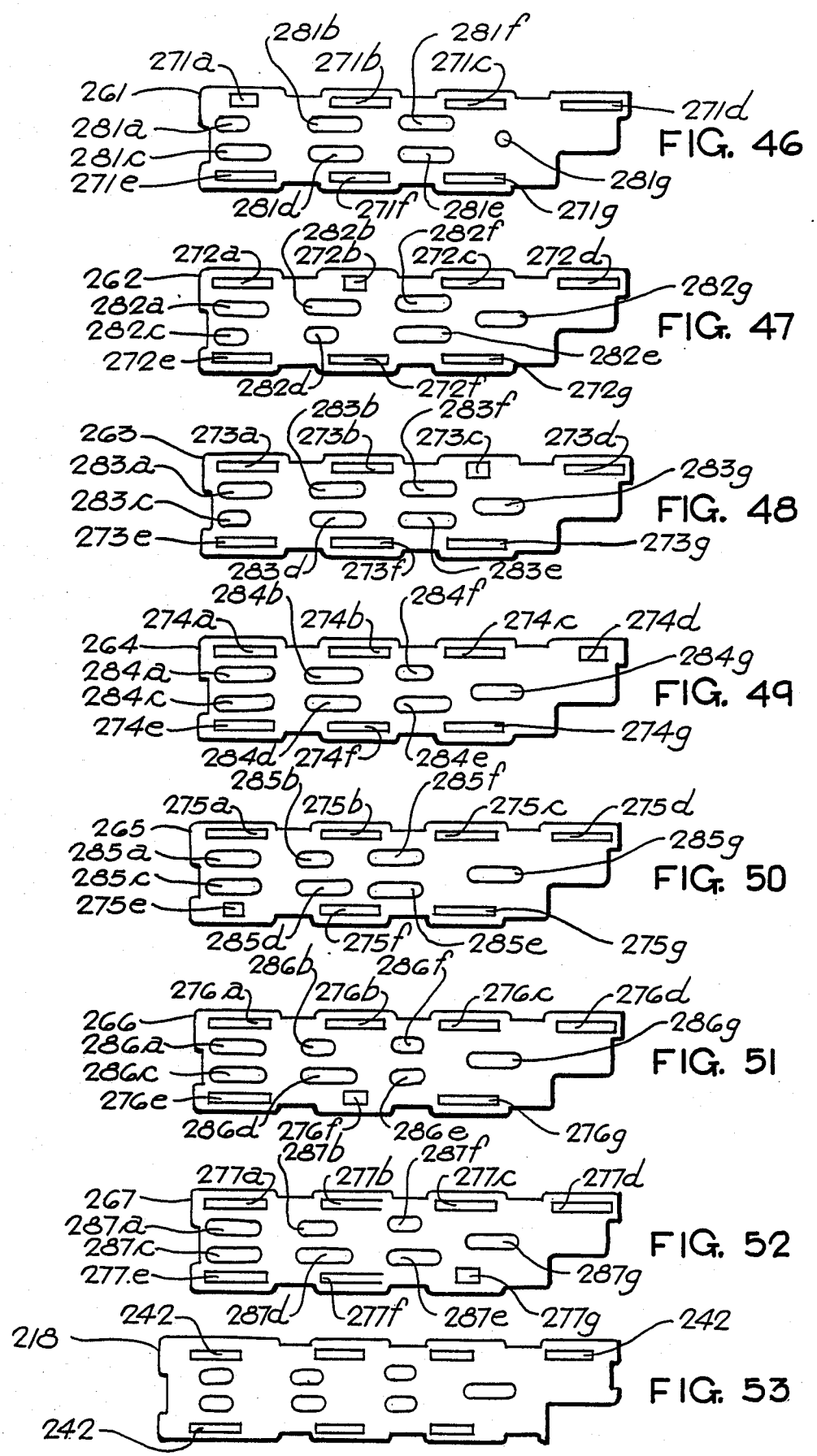

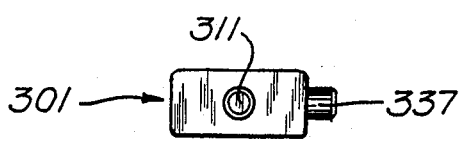
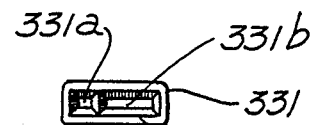
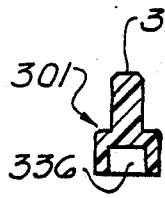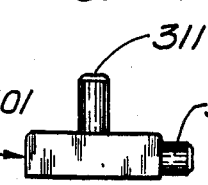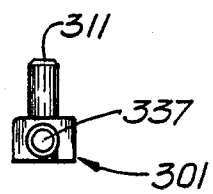
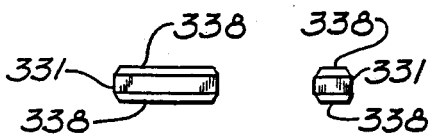
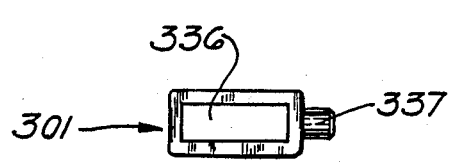
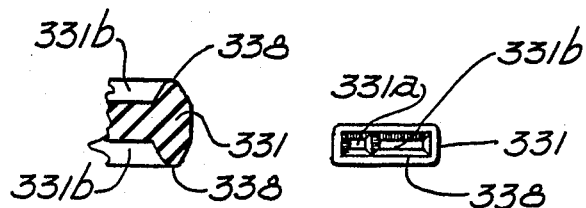
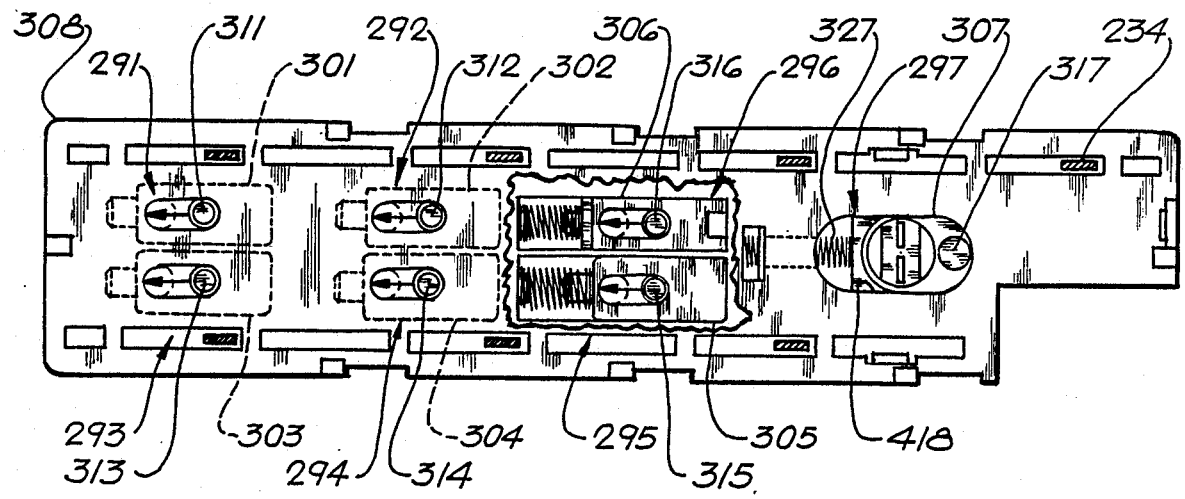

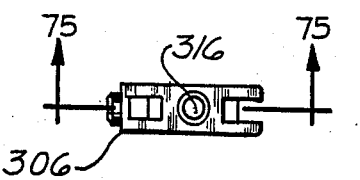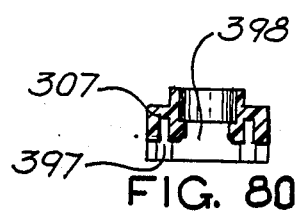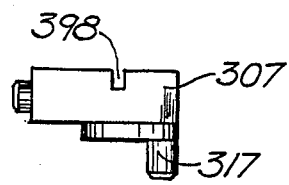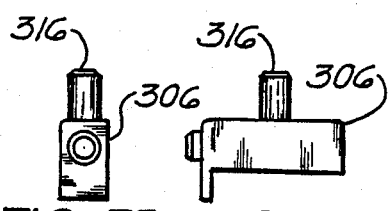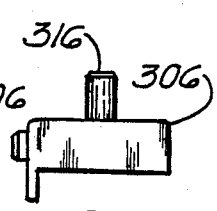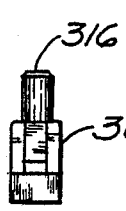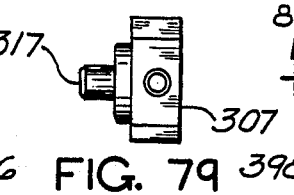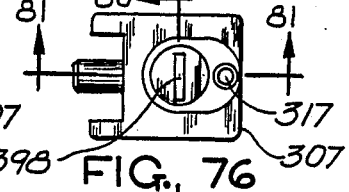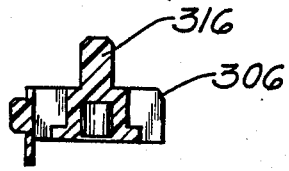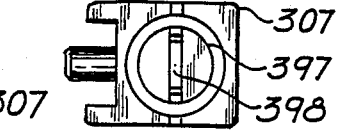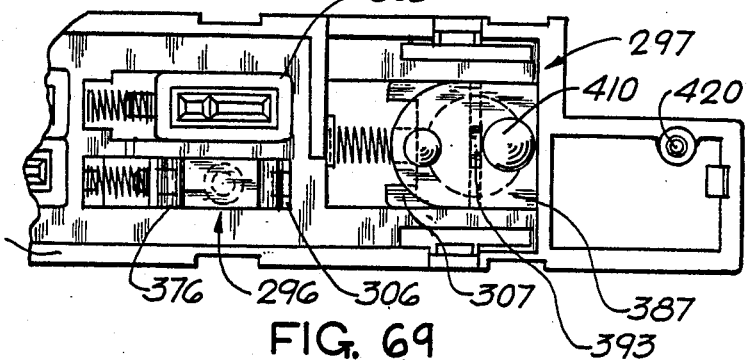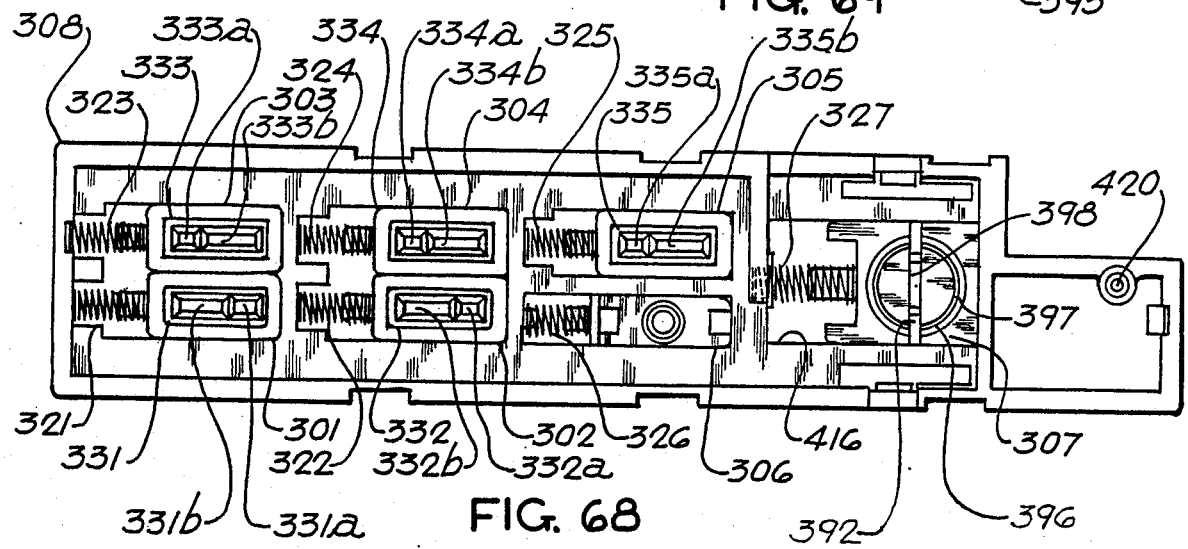

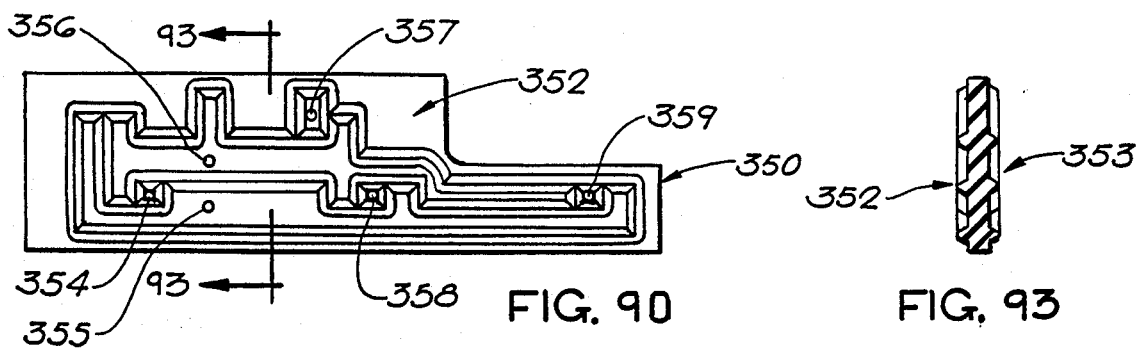
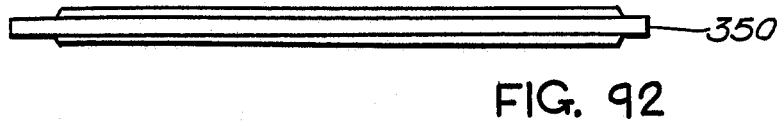
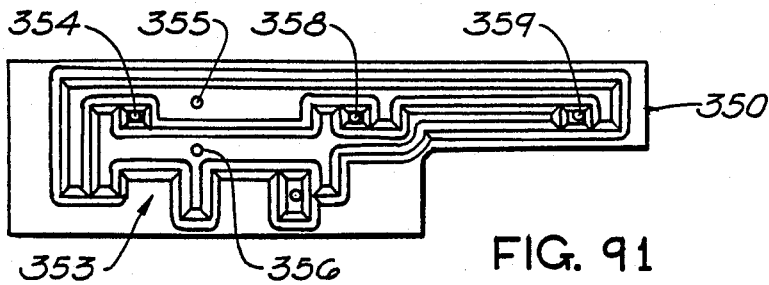
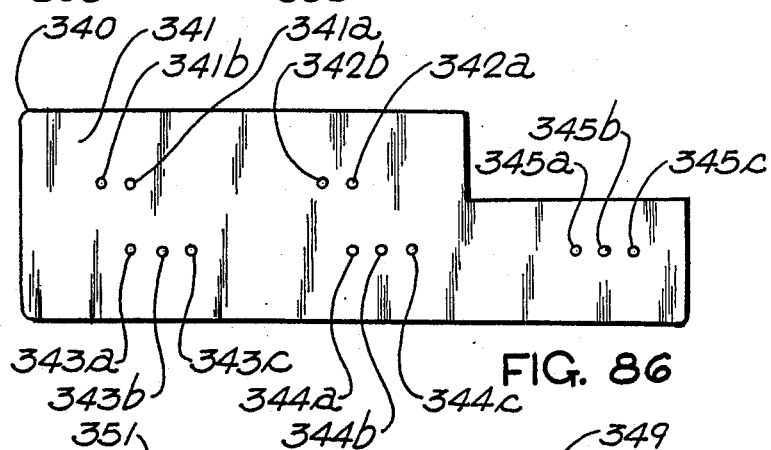
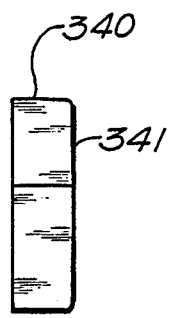
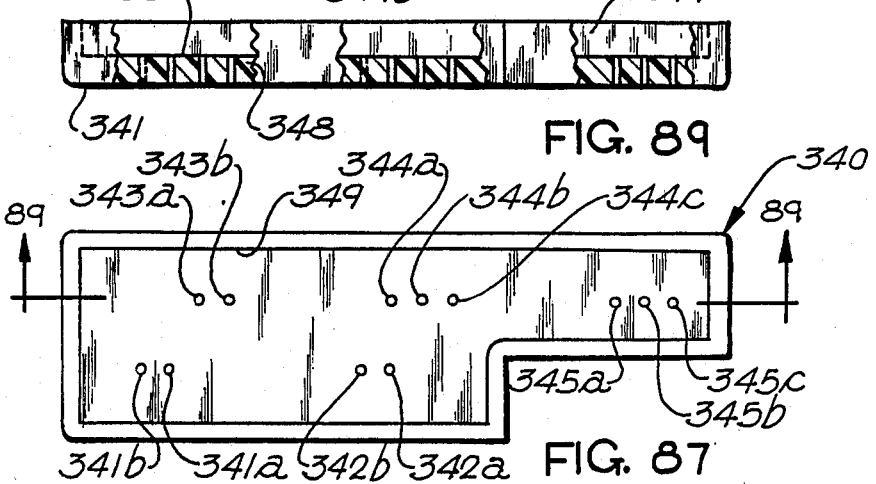

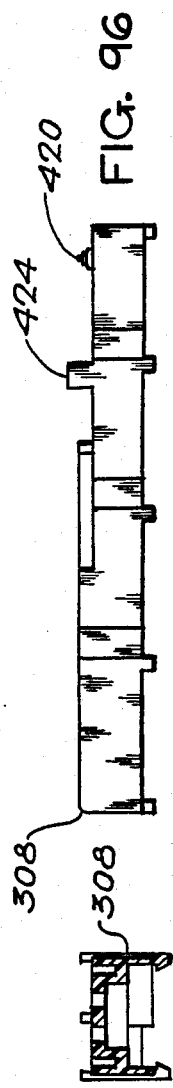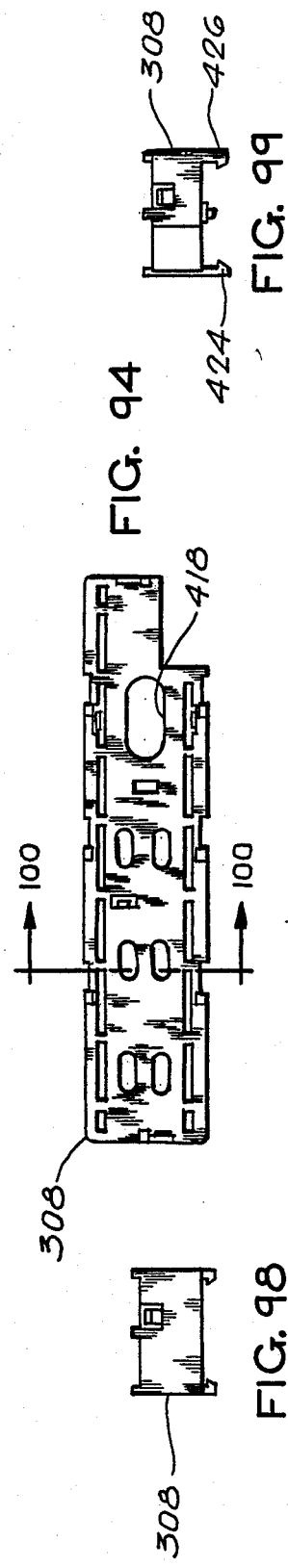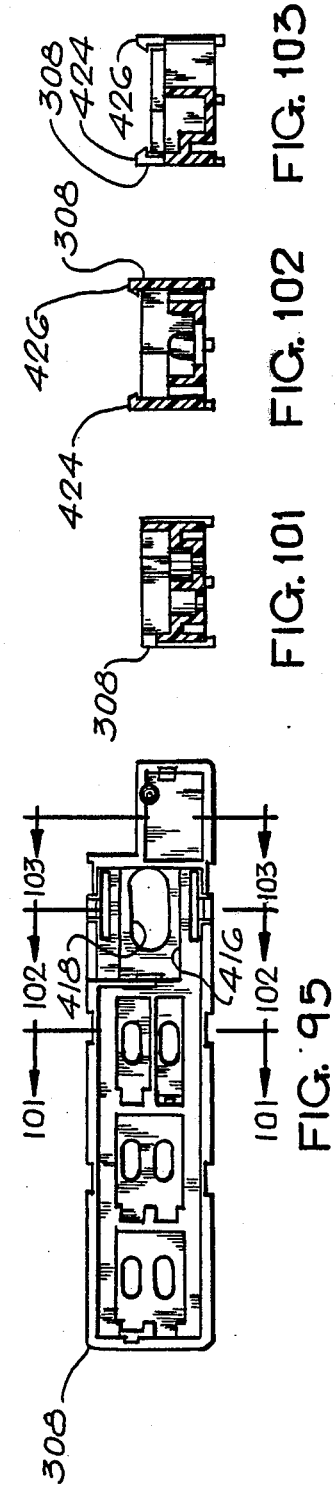

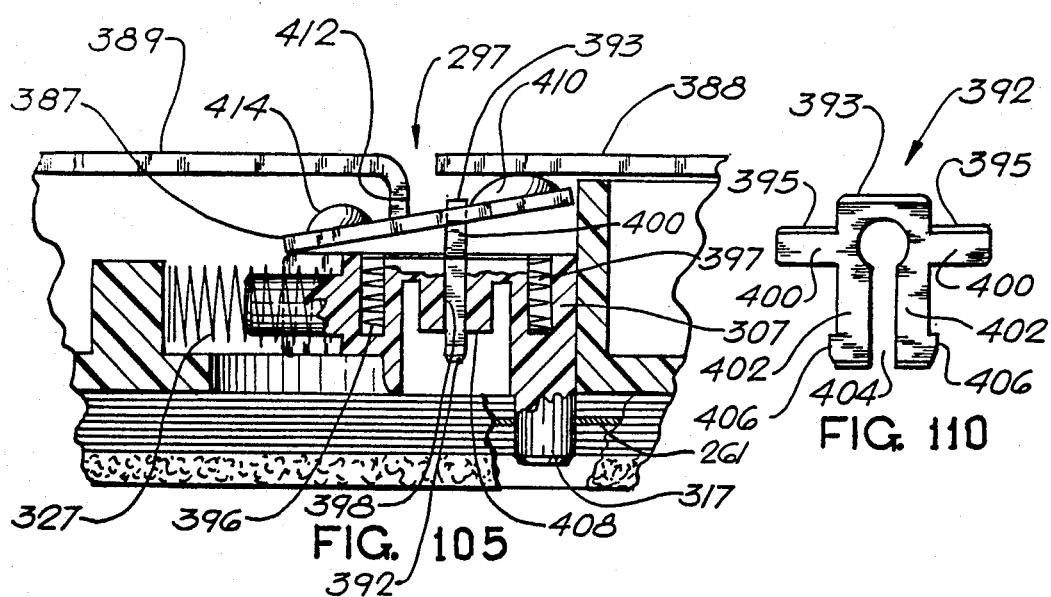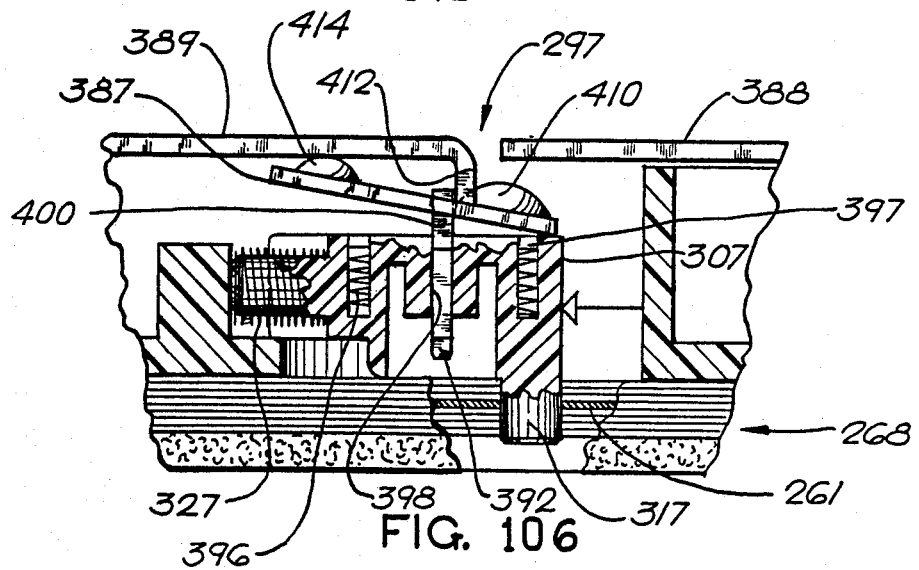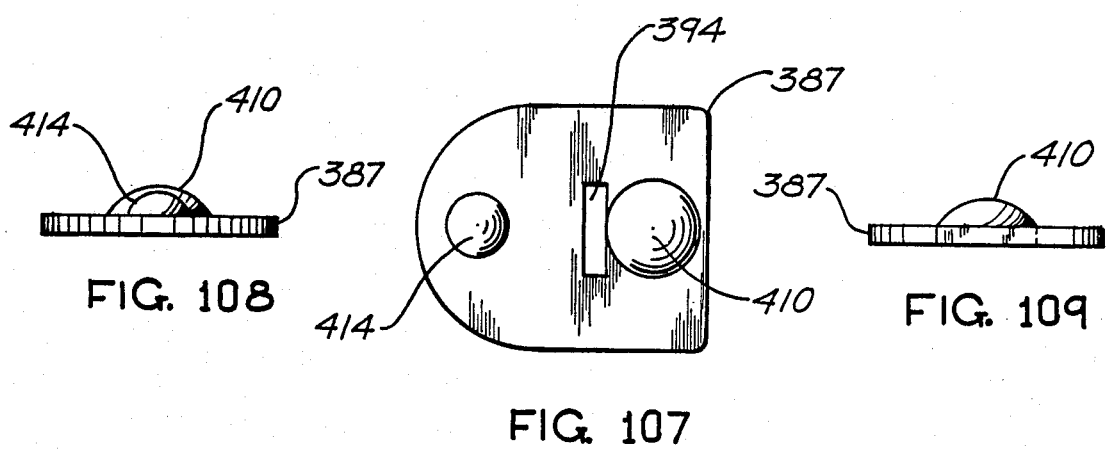

SNAP-ACTION ELECTRICAL SWITCH FOR AUTOMOTIVE AIR CONTROL UNITS

This application is a division of application Ser. No. 930,000, filed Nov. 10, 1986, now U.S. Pat. No. 4,720,612, issued Jan. 19, 1988.

FIELD OF THE INVENTION

This invention relates to control units for controlling the various functions of automotive heating, ventilating and air conditioning systems. Such control units select various modes of operation, which may include ventilation, heating, windshield defogging or defrosting, a combination of heating and windshield defogging, maximum air conditioning, normal air conditioning, and OFF, for example. In some cases, some of the functions may be omitted, particularly the air conditioning functions.

BACKGROUND OF THE INVENTION

A variety of control units have been employed for controlling automotive heating, ventilating and air conditioning systems. Typically, a control unit includes a single movable function control member, such as a lever or slider, having a multiplicity of positions, corresponding with the desired functional modes of operation. In a typical control unit, the multiposition lever or slider operates both a multiposition vacuum control valve and one or more electrical switches. The switches may control the energization of a blower motor and an air conditioning clutch, whereby an air conditioning compressor is driven. The multiposition vacuum control valve supplies intake manifold vacuum to various vacuum motors for operating doors or valve plates in the air duct system, for controlling the movement of air to and from the desired locations in the system.

In addition to the function control unit, there is usually a heat control, which may be in the form of a movable lever or slider, for regulating the amount of heat supplied by the system, and a multiposition blower speed control switch, for regulating the speed of the blower motor.

The typical control unit, having a single function control lever or other member, suffers from the disadvantage that some drivers find it difficult to adjust the lever to the desired position, without being unduly distracted from the primary task of driving the vehicle. While the typical control unit has a detent mechanism for detaining the control lever in the desired positions, the lever can also be adjusted to ambiguous positions, between the various detented positions.

SUMMARY OF THE INVENTION

One object of the present invention is to provide a new and improved snap-action electrical switch which is highly advantageous for use in a pushbutton operated automotive air control unit, but will find many other applications.

To achieve this and other objects, the present invention provides a new and improved snap-action electrical switch with a movable contactor having a combination of sliding and rocking movement.

More specifically, the present invention may provide a snap-action electrical switch, comprising a movable carriage, means guiding such carriage for movement along a predetermined path between first and second positions, a fixed contact spaced from such carriage along such path, fulcrum means on such carriage, an electrical contactor mounted on such fulcrum means for movement with such carriage and for rocking movement on such fulcrum means, and contactor rocking means for engaging such contactor on one side of such fulcrum means to rock such contactor into electrical engagement with such fixed contact when such carriage is in its first position, the movement of such carriage to such second position causing movement of such contactor relative to such contactor rocking means until such fulcrum means passes such contactor rocking means whereby such contactor is abruptly rocked out of engagement with such fixed contact.

Such fulcrum means preferably includes a movable fulcrum member and spring means for biasing such fulcrum member and such contactor to afford spring pressure between such contactor and such fixed contact and also between such contactor and such contactor rocking means.

Such fulcrum member preferably includes a locating projection, such contactor having a slot for loosely receiving such locating projection. Such locating projection and such slot constitute locating elements for rockably retaining such contactor on such fulcrum member.

Such contactor rocking means preferably includes an additional fixed electrical contact having lug means slidably engaging such contactor. Such lug means preferably includes a pair of lugs for slidably engaging such contactor while straddling such locating projection as it extends from said fulcrum member through such slot in such contactor.

Such contactor preferably has a contact point for movement into and out of engagement with the first mentioned fixed contact. When the contact point engages the first fixed contact, the contactor forms a conductive bridge between the first contact point and the lugs on the contactor rocking means.

BRIEF DESCRIPTION OF THE DRAWINGS

Further objects, advantages and features of the present invention will appear from the following description, taken with the accompanying drawings, in which:

FIG. 9 is a front elevational view of the removable front wall of the control unit, removed therefrom.

FIG. 10 is a top plan view of such front wall.

FIG. 11 is a bottom plan view of such front wall.

FIG. 12 is a right side elevational view of such front wall.

FIG. 13 is a sectional view, taken generally along the line 13—3 in FIG. 9.

FIG. 14 is a front elevational view of one of the pushbuttons of the upper row, such pushbutton being removed from the control unit.

FIG. 15 is a rear elevational view of the pushbutton of FIG. 14.

FIG. 16 is a top plan view of such pushbutton.

FIG. 17 is a bottom view of such pushbutton.

FIG. 18 is a left side elevation, partly in section along the line 18—18 in FIG. 16.

FIG. 19 is a front elevational view of one of the pushbuttons of the lower row, such pushbutton being removed from the control unit.

FIG. 20 is a rear elevation of the pushbutton of FIG. 19.

FIG. 21 is a top plan view of such pushbutton of FIG. 19.

FIG. 22 is a bottom plan view of such pushbutton of FIG. 19.

FIG. 23 is a left side elevational view, partly in section along the line 23—23 in FIG. 21.

FIG. 24 is a front elevational view of a pushbutton-receiving housing, removed from the control unit of FIG. 1.

FIG. 25 is a bottom plan view of the housing of FIG. 24.

FIGS. 26 and 27 are opposite end view of such housing.

FIG. 28 is a rear elevation of such housing.

FIG. 29 is a sectional view, taken generally along the line 29—29 in FIG. 24.

FIG. 30 is a sectional view, taken generally along the broken line 30—30 in FIG. 24.

FIG. 31 is an enlarged front elevational view of a slidable latching bar, employed in the pushbutton-receiving housing of FIGS. 24-30, for selectively latching the pushbuttons.

FIG. 32 is a top plan view of the latching bar.

FIG. 33 is a bottom plan view of the latching bar.

FIGS. 34 and 35 are opposite end views of the latching bar.

FIG. 36 is a fragmentary enlarged horizontal section, showing a partial assembly comprising two of the upper-row pushbuttons, the pushbutton-receiving housing, the latching bar, the block-out mechanism, and the stack of selector plates, the view being taken generally along the line 36—36 in FIG. 24.

FIG. 37 is an enlarged horizontal inset section, taken generally as indicated by the inset circle in FIG. 36, along the line 37—37 in FIG. 24.

FIG. 38 is a fragmentary horizontal section, similar to FIG. 36, but showing one of the pushbuttons in its depressed and latched position.

FIG. 39 is an enlarged inset section, similar to FIG. 37, but showing the pushbutton, the corresponding lever, and the corresponding selector plate in changed positions, due to the depression of the pushbutton.

FIGS. 40 and 41 are front and rear elevational views of one of the block-out members or sliders.

FIGS. 42 and 43 are top and side views of the block-out member of FIGS. 40 and 41.

FIGS. 46-52 are front elevational views of the seven movable selector plates, operable by the seven latching pushbuttons, through the intermediate movement of the corresponding levers.

FIG. 53 is a front elevational view of a rear closure plate for the pushbutton-receiving housing.

FIG. 57 is an enlarged front elevational view of a valve-and-switch housing, comprising vacuum control valves and electrical switches operable by the selector plates of FIGS. 46-52.

FIG. 58 is a front view of one of the several valve carriages employed in the control assembly of FIG. 57.

FIG. 59 is a plan view of such valve carriage.

FIG. 60 is a rear view of the valve carriage.

FIG. 61 is an end view of the valve carriage.

FIG. 62 is a vertical cross section taken through such valve carriage.

FIGS. 63 and 64 are front and rear views of a rubber valve member, employed in the valve carriage of FIGS. 58-62.

FIGS. 65 and 66 are plan end views of the rubber valve member.

FIG. 67 is an enlarged fragmentary cross section taken through the rubber valve member.

FIG. 68 is a rear view of the valve-and-switch housing of FIG. 57, showing the several valve carriages, valve members and switch carriages, assembled in the housing.

FIG. 69 is a fragmentary rear view, similar to a portion of FIG. 68, but also showing the switch contactors assembled on the switch carriages.

FIG. 70 is a front view of one of the switch carriages, usually used in connection with the switch for the air conditioning clutch.

FIG. 71 is a rear view of the switch carriage of FIG. 70.

FIG. 72 is a plan view of such switch carriage.

FIGS. 73 and 74 are opposite end views of the switch carriage of FIG. 70.

FIG. 75 is a horizontal section, taken generally along the line 75—75 in FIG. 71.

FIGS. 76 and 77 are front and rear views of another switch carriage, usually used as a component of the OFF switch for the control unit.

FIGS. 78 and 79 are plan and end views of the switch carriage of FIG. 76.

FIG. 80 is a vertical section, taken generally along the line 80—80 in FIG. 76.

FIG. 81 is a horizontal section, taken generally along the line 81—81 in FIG. 76.

FIGS. 86 and 87 are front and rear views of the plastic valve port member.

FIG. 88 is an end view of such valve port member.

FIG. 89 is a plan view, partly in section, along the line 89—89 in FIG. 87.

FIGS. 90 and 91 are front and rear views of the rubber maze plate or member, adapted to be mounted in the valve port member of FIGS. 86-89.

FIG. 92 is a plan view of the maze plate.

FIG. 93 is a vertical section, taken generally as indicated by the line 93—93 in FIG. 90.

FIGS. 94 and 95 are front and rear views of the valve-and-switch housing, shown separately.

FIGS. 96 and 97 are top and bottom plan views of such valve-and-switch housing.

FIG. 98 and 99 are opposite end views of such housing.

FIG. 100 is a vertical section, taken generally along the line 100—100 in FIG. 94.

FIGS. 101, 102 and 103 are vertical sections, taken generally along the lines 101—101, 102—102 and 103—103 in FIG. 95.

FIG. 105 is an enlarged horizontal section, similar to a portion of a FIG. 54, and showing additional details of the OFF switch, in its initial, normally closed position.

FIG. 106 is a horizontal section, similar to FIG. 105, but showing the OFF switch in its actuated, open position.

FIG. 107 is an enlarged rear elevational view of the rockable contactor for the OFF switch of FIGS. 105 and 106.

FIGS. 108 and 109 are opposite end views of the contactor of FIG. 107.

FIG. 110 is an enlarged elevational view of the plate whereby the contactor of FIG. 107 is rockably supported.

DETAILED DESCRIPTION OF AN ILLUSTRATIVE EMBODIMENT

Figure 1:
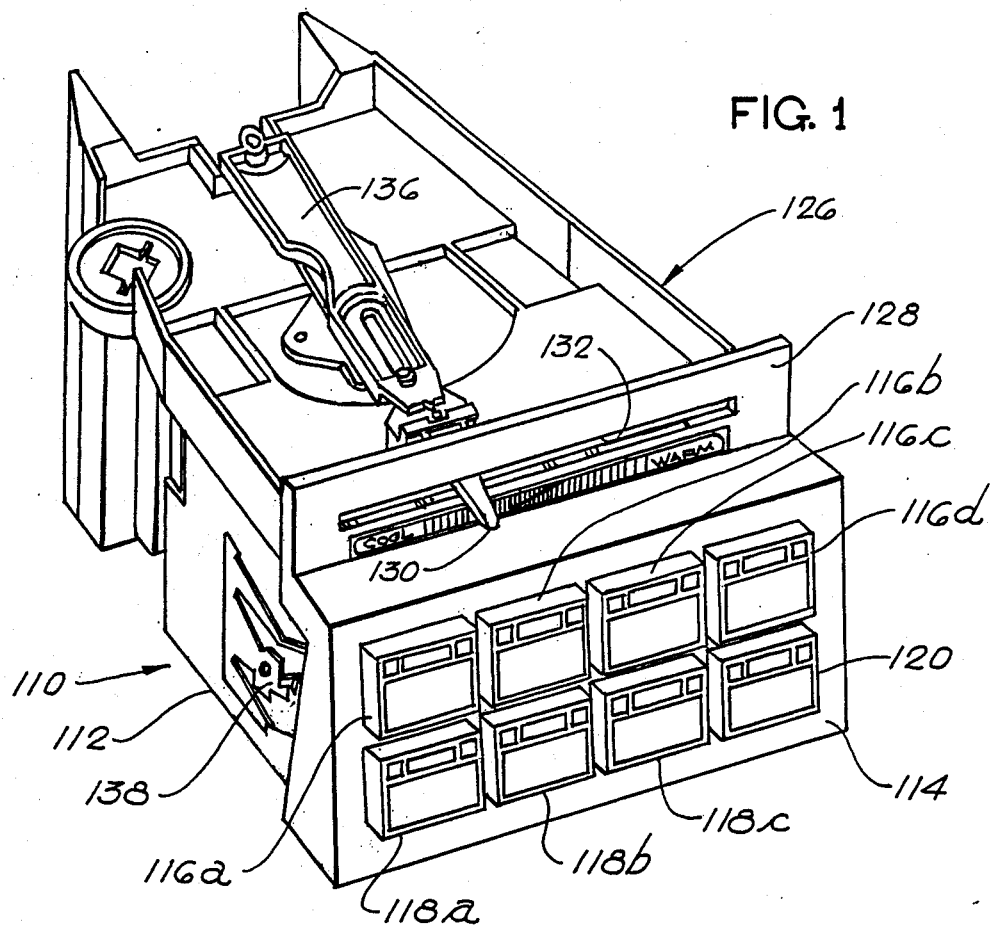
FIG. 1 is a perspective view of a vacuum-electric control unit to be described as an illustrative embodiment of the present invention, the control unit being shown with a heat control mechanism mounted on its upper side.

As indicated above, FIGS. 1-8 of the drawings illustrate a vacuum-electric control unit or switch 110 for controlling the operation of a heating, ventilating and air conditioning system for an automobile or other automotive vehicle. If the vehicle is not equipped with air conditioning, the control unit 110 may be simplified so that it controls only the heating and ventilating functions. The control unit 110 is adapted to select the desired mode of operation of the heating, ventilating and air conditioning system.

The control unit 110 comprises housing means, including a box-like outer housing 112, preferably made of a suitable resinous plastic material. The illustrated outer housing 112 has a front panel or wall 114, also preferably made of a resinous plastic material, which is latched or otherwise secured to the housing 112. The front panel 114 supports and guides a total of eight manually depressible pushbuttons, also preferably made of a resinous plastic material. The pushbuttons are arranged in upper and lower rows. Seven of the eight pushbuttons are employed to select the desired operating mode of the heating, ventilating and air conditioning system. The eighth pushbutton is employed to energize a rear window defrosting heater.

More specifically, there are four upper-row pushbuttons 116a, 116b, 116c and 116d. For convenience, these upper-row pushbuttons will sometimes be referred to as 116. All of these pushbuttons 116-116d are mode selector pushbuttons for the heating, ventilating and air conditioning system. There are three lower-row pushbuttons 118a, 118b and 118c which are also employed for mode selection. For convenience, these lower-row pushbuttons will sometimes be referred to collectively as 118. There is also a fourth lower-row pushbutton 120, which is the eighth pushbutton, used for energizing the rear window defrosting heater.

The pushbuttons 116, 118 and 120 are labelled with legends to indicate the functions or modes controlled by depression of the pushbuttons. Thus, the pushbutton 116a is labelled OFF, indicating that the normal energizing circuit to the blower motor is turned off, when this pushbutton is depressed. The outside air door is closed, and any air which may recirculate through the heating system is directed through the floor outlets.

The second upper-row pushbutton 116b is labelled FLOOR, indicating that all of the air from the heating system is directed through the floor outlets. The outside air door is open, and the blower motor switch is turned on.

The third upper-row pushbutton 116c is labelled DEF/FLOOR, indicating that the air from the heating system is split between the floor outlets and the defrost outlets, adapted to direct air upon the windshield. The outside air door is open, and the blower motor switch is turned on.

The fourth upper-row pushbutton 116d is labelled DEF, indicating that all of the air is directed through the defrost outlets. The outside air door is open, and both the blower motor switch and the air conditioning clutch switch are turned on. The energization of the air conditioning system facilitates the defogging of the windshield under conditions of high humidity.

The first lower-row pushbutton 118a is labelled PANEL VENTS. When this pushbutton is depressed, all of the air is directed through the panel vents, rather than the defrost outlets or the floor outlets. The outside air door is open, and the blower motor switch is turned on.

The second lower-row pushbutton 118b is labelled MAX A/C, standing for maximum air conditioning. When this pushbutton is depressed, all of the air is directed through the panel vents. The outside air door is closed, and all of the air is recirculated. Both the blower motor switch and the switch for the air conditioning clutch are turned on.

The third lower-row pushbutton 118c is labelled A/C, standing for air conditioning. When this pushbutton is depressed, all of the air is directed through the panel outlets. The outside air door is open. Both the blower motor switch and the switch for the air conditioning clutch are turned on.

The upper-row pushbuttons 116a–116d and the first three lower-row pushbuttons 118a–118c are adapted to be latched, one at a time, when depressed. The latching of the pushbuttons is accomplished by a latching mechanism, soon to be described. When each pushbutton is depressed, any previously latched pushbutton is unlatched, so that it returns to its extended position, by the action of its return spring. A block-out mechanism, soon to be described, prevents the simultaneous depression of more than one pushbutton.

The eighth pushbutton 120 is labelled R.DEF, standing for rear window defroster. Momentary depression of this pushbutton 120 energizes the rear window defrosting heater, which is turned off later by a timer. The eighth pushbutton 120 does not latch down, but returns to its extended position by the action of its return spring.

It will be understood that the operating modes assigned to the various pushbuttons 116 and 118 may be varied. Moreover, the number of pushbuttons may be varied. If one or more of the operative pushbuttons 116 and 118 are not needed for any particular control unit, one or more dummy pushbuttons may be substituted for the unneeded operative pushbutton.

At the front of the outer housing 112, the front panel 114 is formed with eight generally rectangular openings 124 for supporting and guiding the sliding movement of the eight pushbuttons 116, 118 and 120.

As illustrated in FIG. 1, a heat control mechanism 126 is adapted to be mounted on top of the control unit 110. The heat control mechanism 126, which may be of any known or suitable construction, is employed to operate the heat regulatig valve, for controlling the amount of heat developed by the heating system. The front panel 114 of the control unit 110 has portion 128 which serves as the front panel for the heat control mechanism 126.

Figure 2:
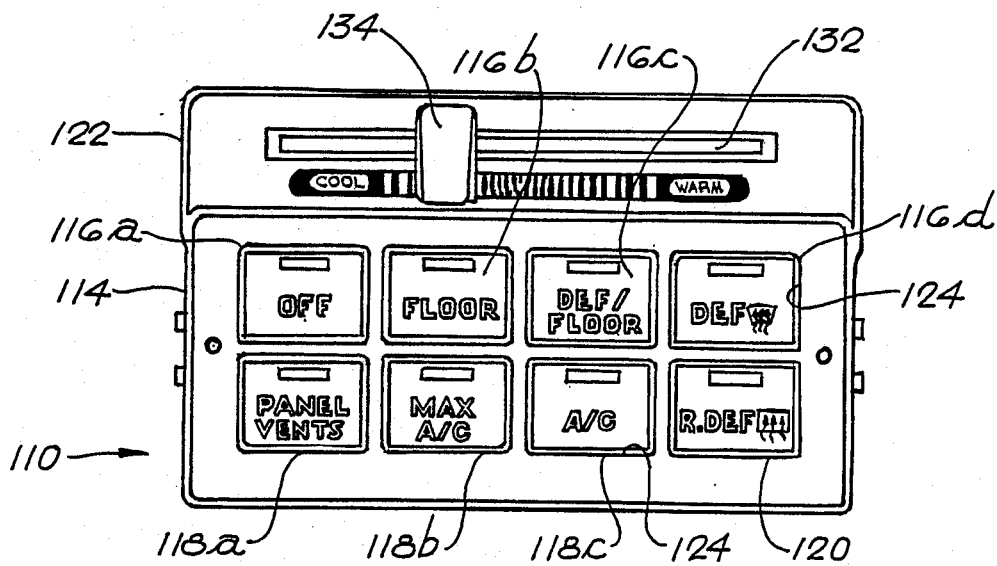
FIG. 2 is a front elevational view of the control unit of FIG. 1.

The illustrated heat control mechanism 126 comprises a slider arm 130 which projects forwardly through a horizontal slot 132, formed in the panel portion 128. The slider arm 130 is slidable along the slot 132, between left and right hand extreme positions, which are identified by the legends COOL and WARM on the panel portion 128, as shown in FIGS. 1 and 2. The slider arm 130 is adapted to receive a slider knob 134, as shown in FIG. 2.

The slider arm 130 is suitably coupled to a lever 136 which is adapted to operate a control cable, not shown, extending to a heat control valve. Heat control mechanisms of this kind are known to those skilled in the art.

The control unit 110 may include internal illuminating means, of any known or suitable construction, for illuminating all of the translucent legends on the pushbuttons 116, 118 and 120, and the legends on the front panel portion 128. For example, the illuminating means may comprise lamp bulbs and a system of light transmitting plates and bars.

As shown in FIG. 1, the control unit 110 may be provided with a pair of clips 138, made of spring metal, for retaining the housing 112 in a dashboard opening on the vehicle. The clips 138 are mounted on the opposite sides of the housing 112. Such clips 138 may be of any known or suitable construction.

Figure 6:
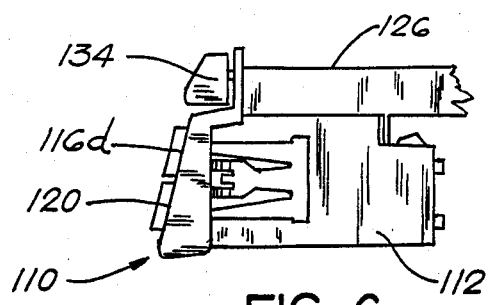
FIG. 6 is a right side elevational view of the control unit, with the heat control mechanism mounted thereon.
Figure 3:
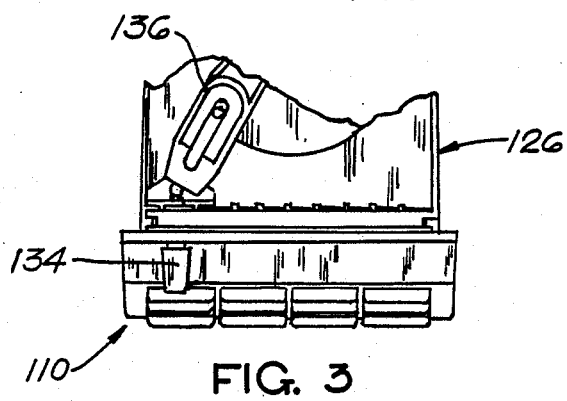
FIG. 3 is a fragmentary top plan view of the control unit, with the heat control mechanism mounted thereon.
Figure 4:
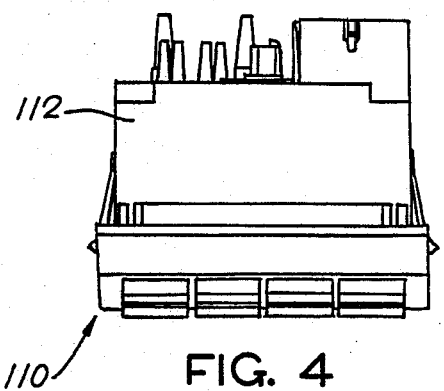
FIG. 4 is a top plan view of the control unit, with the heat control mechanism removed.
Figure 5:
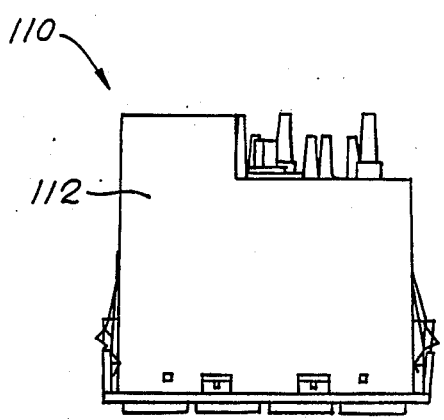
FIG. 5 is a bottom plan view of the control unit.
Figure 7:
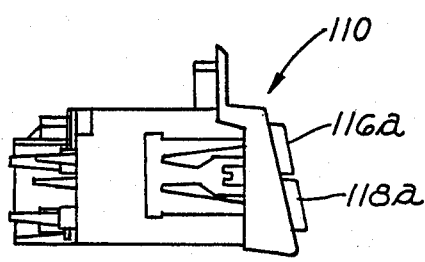
FIG. 7 is a left side elevational view of the control unit, with the heat control mechanism removed.

Further details of the control unit 110 will be evident from the elevational and plan views of FIGS. 3-8, in which the control unit 110 is shown with the heat control mechanism 126 mounted thereon in FIGS. 3 and 6, while being shown with the heat control mechanism removed from the control unit in FIGS. 4, 5, 7 and 8.

The front panel or wall 114 is shown separately in FIGS. 9–13, which clearly illustrate the guide openings 124 and the slot 132.

FIGS. 14–16 illustrate one of the upper-row pushbuttons 116 separately while FIGS. 19–23 illustrate one of the lower-row pushbuttons 118 separately. The two types of pushbuttons 116 and 118 are quite similar, and to that extent will be described with the use of the same reference characters. Thus, each of the pushbuttons 116 and 118 has a front, generally rectangular body portion 140 which is slidably guided in one of the openings 124 formed in the front panel or wall 114. Each of the pushbuttons 116 and 118 has an enlarged flange portion 142 for retaining the pushbutton behind the front wall or panel 114.

Each of the pushbuttons 116 and 118 has a rearwardly projecting prong or finger 114, serving as a pusher, and a rearwardly projecting latching prong or finger 146. The pushbuttons 116 and 118 differ in the exact locations of the pusher 144 and the latching finger 146. As to each of the upper-row pushbuttons 116, the latching finger 146 projects rearwardly from the lower left portion of the pushbutton, as shown in FIGS. 15–18. The pusher 144 projects rearwardly from the lower right portion of the pushbutton, but at an elevation somewhat above the elevation of the latching finger 146.

As to each of the lower-row pushbuttons 118, both the pusher 144 and the latching finger 146 project rearwardly from the upper right hand portion of the pushbutton, as shown in FIGS. 20–23. However, the pusher 144 is slightly to the right of the latching finger 146, and somewhat below the elevation of the latching finger.

As to each of the pushbuttons 116 and 118, the pusher 144 is in the form of a substantially rectangular prong, molded in one piece with the resinous plastic pushbutton. The larger cross-sectional dimension of the pusher prong 144 is oriented vertically.

As to each of the pushbuttons 116 and 118, the latching prong 146 has a generally rectangular cross section, with its larger dimension oriented horizontally. Each latching finger 146 has a latching tooth 148, projecting laterally and located toward the rear end of the finger 146. Each latching tooth 148 has a rearwardly facing ramp surface 150 and a forwardly facing abrupt surface 152. A lateral notch 154 is formed in one edge of the latching finger 146, in front of the latcing tooth 148.

Each latchign finger 146 tapers to a reduced rear end portion 156, preferably having a rounded nose 158. The taper occurs along a tapered portion 160. The reduced rear end portion 156 is adapted to cooperate with the block-out mechanism, soon to be described.

The latching pushbuttons 116 and 118 of the upper and lower rows are adapted to be received and supported in a pushbutton-receiving housing 162, shown separately in FIGS. 24-30. The pushbutton-receiving housing 162 is mounted within the main housing 112 by latches or other suitable means. As shown in FIG. 24, the housing 162 has a front wall 164, formed with an upper row of four generally rectangular openings 166, for slidably receiving the latching fingers 146 of the upper-row pushbuttons 116. Similarly, the front wall 164 is formed with a lower row of three generally rectangular openings 168, for slidably receiving the latching fingers 146 of the lower-row pushbuttons 118. The openings 166 and 168 extend through generally rectangular guide sleeves 170 and 172, projecting forwardly from the front wall 164 of the housing 162.

The front wall 164 is also formed with an upper row of four slots 176 for receiving the pusher prongs 144 of the upper-row pushbuttons 116. Similarly, the front wall 164 is formed with a lower row of three slots 178 for slidably receiving the pusher prongs 144 of the lower row pushbuttons 118. The housing 162 has upper and lower walls 180 and 182, into which the pusher slots 176 and 178 extend, to a depth which limits the extent to which the pushbuttons 116 and 118 can be depressed. The pushbutton-receiving housing 162 is preferably made of a suitable resinous plastic material.

The control unit 110 includes means for latching the mode selection pushbuttons 116 and 118 in their depressed positions, such means being illustrated as comprising a latching bar 186, slidably mounted in the pushbutton-receiving housing 162, along the rear side of the front wall 164 thereof, as shown in FIGS. 36 and 38. The latching bar 186 is illustrated separately in FIGS. 31-35. The latching bar 186 is biased to the left toward its initial position by spring means, illustrated in FIGS. 36 and 38 as comprising a compression coil spring 188, compressed between the right hand end wall 190 of the housing 162 and a member 192 at the right hand end of the latcing bar 186, which also has a pin 194, projecting to the right from the member 192, and received within a portion of the coil spring 188. A flange 196 also projects to the right from the rear portion of the latching bar 186 to contain and stabilize the spring 188.

The latching bar 186 also has seven flanges 198 with latching teeth 200 thereon, to cooperate with the latching teeth 148 on the pushbuttons 116 and 118. Four of the flanges 198 project upwardly from the latching bar 186, to cooperate with the upper-row pushbuttons 116. The other three flanges 198 project downwardly, to cooperate with the lower-row pushbuttons 118. Each of the latching teeth 200 has a forwardly facing ramp 202 which slopes rearwardly and to the left until the ramp 202 comes to a laterally projecting crest or peak 204, to the rear of which the tooth 200 has a shorter, rearwardly facing ramp 206, sloping rearwardly and to the right, until the ramp 206 intersects with a vertical surface 208.

In FIG. 38, the right hand pushbutton 116c is shown in its unlatched, extended position, in which the ramp surface 150 of its latching tooth 148 engages the forwardly facing ramp 207 of the corresponding latching tooth 200 on the latch bar 186. The left hand pushbutton 116b is in its depressed and latched position, in which the vertical surface 152 of its latching tooth 148 is latched behind the vertical surface 208 of the corresponding tooth 200. If the right hand pushbutton 116c is depressed, the ramp surface 150 of its latching tooth 148 slides along the forwardly facing ramp 207 and causes movement of the latching bar 186 to the right, which has the effect of unlatching the left hand pushbutton 116b, so that it is returned to its extended position by its return spring, soon to be described. The latching tooth 148 on the right hand pushbutton 116c travels rearwardly past the crest 204 and then along the rearwardly facing ramp 206, until its vertical surface 152 becomes latched behind the vertical surface 208 of the corresponding tooth 200 on the latching bar 186. In FIG. 36, the right hand pushbutton 116c is in the process of being depressed and is in the position in which its latching tooth 148 is just passing the crest 204 of the tooth 200. The left hand pushbutton 116b has been unlatched and has been returned to its extended position by its return spring.

As shown in FIGS. 36-43, the control unit 110 is provided with a block-out mechanism 210, to prevent the depression of more than one of the pushbuttons 116 and 118 at a time. Such mechanism 210 is illustrated as comprising a series of six blocks 212, made of resinous plastic or some other suitable material. The blocks 212 are shown in their assembled relation in FIGS. 36 and 38. One of the individual blocks 212 is shown separately in FIGS. 40-43. The blocks 212 are generally rectangular but are formed with ramp surfaces 214 adjacent their opposite ends. Each block 212 preferably has four such ramp surfaces 214, so that the blocks are symmetrical and are easy to assemble.

The blocks 212 are arranged in a horizontal row within the pushbutton-receiving housing 162 and are freely slidable in a space 215 between the rear surface 216 of the latching bar 186 and the front surface of a rear closure plate 218, suitably secured to the rear of the housing 162, as by means of latching teeth 220. The left and right hand ends of the space 215 are bounded by flanges or members 222 and 224 on the inside of the housing 162. The length of the space 215 is greater than the total length of the six blocks 212, by an amount slightly greater than the width of the rear prong portion 156, found on the latching finger 146 of each of the mode selection pushbuttons 116 and 118. When any one of the pushbuttons 116 and 118 is depressed, as shown in FIG. 38, the rear end portion 156 of the pushbutton displaces the blocks 212, as needed, and occupies the slack space, represented by the difference between the length of the space 215 and the total length of the blocks 212. With the slack space thus occupied, there is no room for the rear prong portion 156 of any of the other pushbuttons 116 and 118, so that only one pushbutton can be depressed at any one time. When another pushbutton is depressed separately, the previously depressed pushbutton is unlatched, so that it is returned to its extended position by its return spring, so that the rear prong portion 156 of the newly depressed pushbutton can displace the blocks 212 and occupy the newly created location of the slack space. The ramp surfaces 214 on the blocks 212 make it easy for the rear prong portions 156 to displace the blocks and cause them to slide along the space 215.

The pusher prongs 144 of the seven mode selection pushbuttons 116 and 118 are adapted to operate means for driving a selector mechanism, such means being illustrated in FIGS. 36-39, 44 and 45 as comprising seven individual levers 230, all of which are the same in construction, but are mounted in individual positions within the pushbutton-receiving housing 162. The levers 230 are preferably made of metal.

Figure 45:
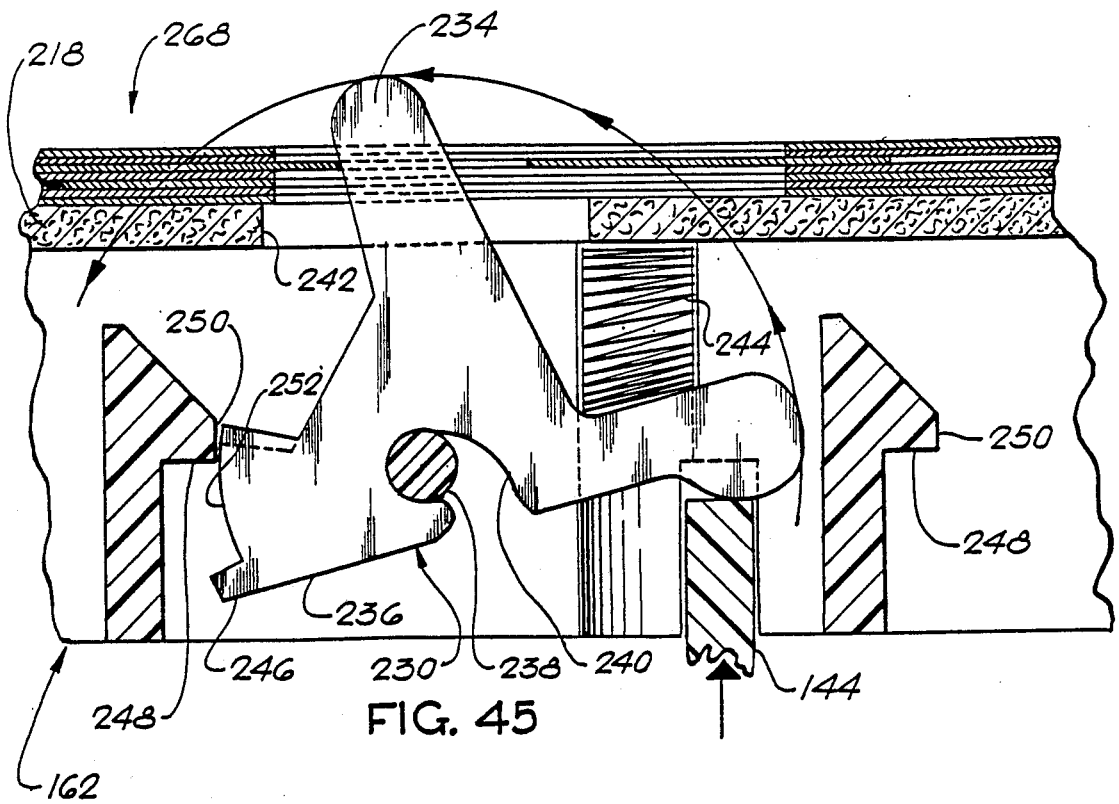
FIG. 45 is a greatly enlarged section, similar to a portion of FIG. 39, and showing the pushbutton, the corresponding lever, and the corresponding selector plate in their changed positions, when the pushbutton is depressed.
Figure 44:
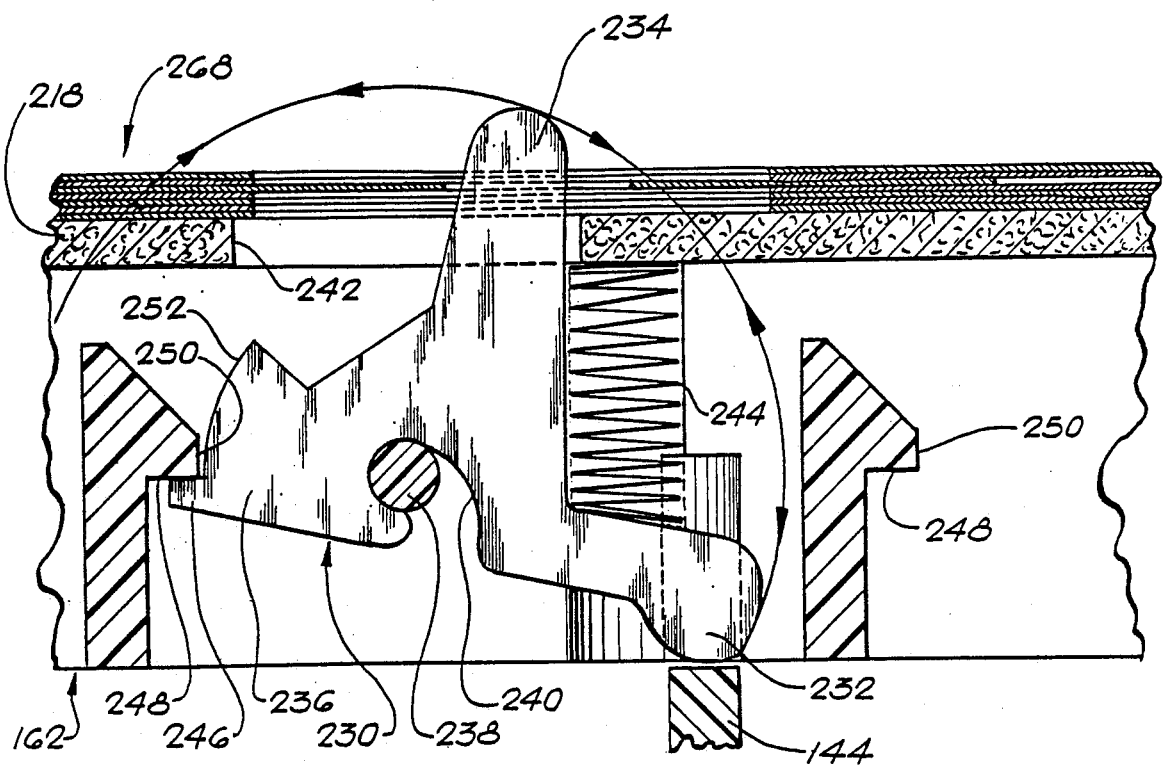
FIG. 44 is a greatly enlarged fragmentary section, similar to a portion of FIG. 37, and showing one of the pushbuttons, the corresponding lever, and the corresponding selector plate in their initial positions, when the pushbutton is extended.
Figure 56:
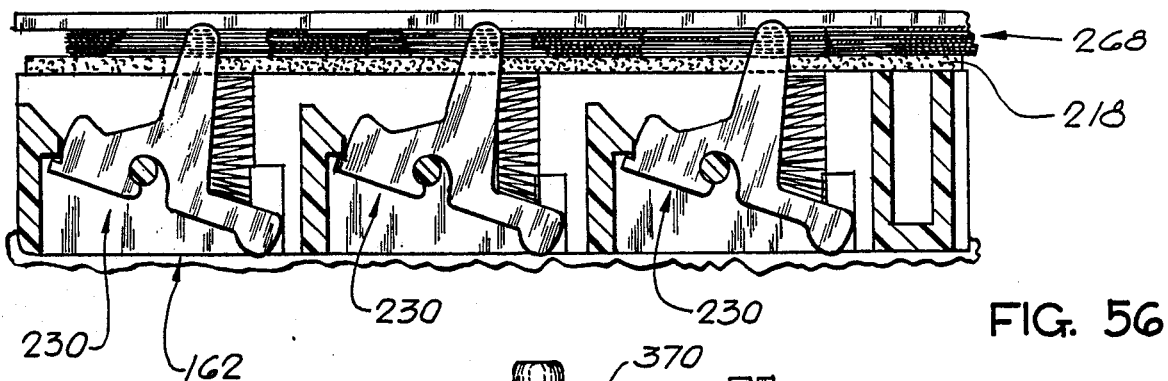
FIG. 56 is a fragmentary horizontal section, somewhat similar to FIG. 39, but showing a row of three of the levers which are operable by the pushbuttons.
Figure 55:
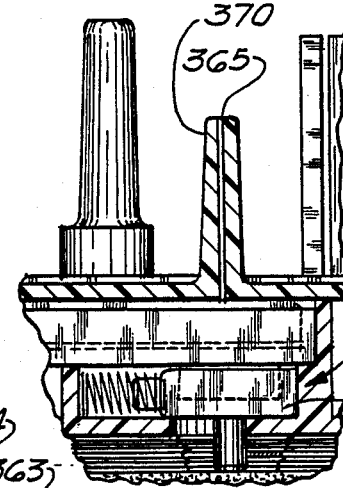
FIG. 55 is a fragmentary horizontal section, similar to a portion of FIG. 54, but taken through one of the lower-row vacuum control valves.

As illustrated in FIGS. 44 and 45, each lever 230 has three arms, comprising a laterally extending input arm 232, a rearwardly extending output arm 234 and a third arm 236, extending in an opposite lateral direction, relative to the lateral direction of the input arm 232. The levers 230 are in substantially horizontal planes and are swingable about seven individual pivots 238, molded or otherwise formed in the housing 162. Each lever 230 is formed with an arcuate slot 240 for receiving the corresponding pivot 238. By virtue of the arcuate slot 240, it is easy to assemble each lever 230 on the corresponding pivot 238.

The rearwardly extending output arm projects rearwardly out of the housing 162 and is swingable laterally along an elongated clearance slot 242, formed in the rear closure plate 218. The seven output arms 234 of the seven levers 230 are adapted to drive a selector mechanism, soon to be described.

The levers 230 are biased toward their initial positions by spring means, illustrated as comprising individual return springs 244 for the individual levers 230. Each spring 244 may be in the form of a coil spring, compressed between the first lever arm 232 and the rear closure plate 218, which may be made of any suitable material, such as a resin-impregnated fibrous material, for example. Each coil spring 244 also acts as the return spring for the corresponding pushbutton 116 or 118.

As shown in FIG. 44, the initial position of each lever 230 is established by a backstop finger 246 on the third lever arm 236, such finger 246 being engageable with a backstop member 248, molded or otherwise formed within the housing 162. The backstop member 248 also has a projecting portion 250 which extends into close proximity with an arcuate portion 252 on the third lever arm 246, to insure that the lever 230 is maintained in its proper position on the pivot 238.

When any particular pushbutton 116 or 118 is extended, the coil spring 244 biases the corresponding lever 230 in a clockwise direction, until the enlarged flange portion 142 of the pushbutton 116 or 118 engages the rear of the front panel 114. The pushbuttons are thus subjected to outward spring pressure, whenever they are not depressed, to avoid rattle. When the pushbutton is depressed, the pusher 144 moves the corresponding input arm 232 rearwardly, as shown in FIG. 45, so that the lever 230 is swung in a counterclockwise direction, whereby the output arm 234 is moved to the left.

The four levers 230 for the four upper-row pushbuttons 116 are swingably received in a horizontal slot 256, molded or otherwise formed in the upper wall 180 of the housing 162, as shown in FIGS. 24-30. Similarly, the three levers 230 for the lower-row pushbuttons 118 are swingably received in a horizontal slot 258, molded or otherwise formed in the lower wall 182 of the housing 162. The horizontal slots 256 and 258 are open at both the front and the rear of the housing 162. The pivots 238 and the backstop members 248 are preferably molded in one piece with the housing 162, so that the pivots and the backstop members extend vertically across the slots 256 and 258. To receive the return springs 244, the slots 256 and 258 are preferably formed with enlarged generally circular nests 260. There are four such nests 260 in the upper slot 256, and three such nests 260 in the lower slot 258.

As shown in FIGS. 44 and 45, the seven output arms 234 of the seven levers 230, operable by the seven pushbuttons 116 and 118, are adapted to operate seven individually slidable selector or actuator plates 261-267, assembled in a stack behind the rear closure plate 218, to form components of a selector mechanism 268. The seven plates 261-267 are shown separately in FIGS. 46-52. The plates 261-267 are preferably made of thin sheet brass or other suitable metal. The seven lever arms 234 extend through seven lever slots in each of the seven plates 261-267. As shown in FIGS. 46-52, the seven slidable actuator or selector plates 261-267 have respective lever slots 271a-271g, 272a-272g, 273a-273g, 274a-274g, 275a-275g, 276a-276g, and 277a-277g. For convenience and brevity, all of these slots will sometimes be referred to collectively as the lever slots 271-277.

Some of these lever slots 271-277 are smaller or shorter slots, adapted to form driving connections between the levers 230 and the selector plates 261-267, while other slots are larger or longer slots, affording clearance for the levers 230, so that the levers move idly in the large slots. In this case, one of the seven selector plates 261-267 is assigned to each of the seven levers 230, operable by the seven pushbuttons 116 and 118. Thus, each of the plates 261-267 has one smaller or driver slot in a unique position, and six larger or idler slots in the other six positions. Thus, the seven selector plates 261-267 comprise the seven unique smaller or driver slots 271a, 272b, 273c, 274d, 275e, 276f, and 277g.

Each of the seven actuator or selector plates 261-267 is also formed with seven output slots or openings for operating seven control devices, which may take the form of either valves or electrical swtiches, or both, in any desired combination. The illustrated control unit 110 happens to have five vacuum control valves and two electrical switches which are operable by some of the seven output openings in the seven plates 261-267. Thus, the seven selector plates 261-267 are formed with seven respective output openings 281a-281g, 282a-282g, 283a-283g, 284a-284g, 285a-285g, 286a-286g, and 287a-287g. For convenience and brevity, all of these output openings will sometimes be referred to as 281-287.

Again, some of the output openings 281-287 are smaller or shorter, to actuate a valve or a switch, while others are larger or longer, so that there is merely idling movement between these openings and the corresponding valves and switches.

As shown in FIGS. 57, 68 and 69, the illustrated control unit 110 is provided with five vacuum control valves 291, 292, 293, 294 and 295, plus two electrical switches 296 and 297. Any other combination of valves and switches would be possible. Moreover, the number of valves and switches may be varied. The valves and switches 291-297 have movable carriages 301-307 which are slidably mounted in a housing 308 which may be made of a resinous plastic or other suitable material. Operating knobs or pins 311-317 project forwardly from the slidable carriages 301-307, for reception in the openings 281-287, formed in the selector plates 261-267. The carriages 301-307 may be made of a resinous plastic or other suitable material.

FIGS. 68 and 69 illustrate the rear sides of the valve-and-switch carriages 301-307, which are shown as having individual return springs 321-327, biasing the carriages to the right, to their initial positions. Each carriage is movable to the left to its actuated position, against the biasing force of the corresponding return spring.

As shown in FIG. 68, the slidable valve carriages 301-305 are hollowed out on their rear sides to receive soft resilient rubber or rubberlike valve members 331–335 which are hollowed out to form respective shorter valve channels 331a–335a and longer valve channels 331b–335b.

All of the valve carriages 301–305 may be the same in construction. FIGS. 58–62 illustrate the valve carriage 301, which is shown as a generally rectangular block having its rear side formed with a hollow space or cavity 336 for receiving the corresponding rubber valve member 331. The actuating knob or pin 311 projects from the front side of the valve carraige 301. A shorter pin 337 projects from one end of the carriage 301, to receive and locate the corresponding return spring 321, which, like all of the return springs 321–327, is in the form of a compression coil spring.

All of the illustrated rubber valve members 331–335 are the same in construction, although they can be different. FIGS. 63–67 illustrate the rubber valve member 331, shown as a generally rectangular rubber or rubberlike block, adapted to be received in the cavity 336, formed in the corresponding valve carriage 301. The shorter and longer valve channels 331a and 331b are shown as being formed in both the front and rear sides of the rubber valve member 331, so that it is reversible, and may be inserted into the cavity 336 in either of its two possible positions. The channels 331a and 331b are surrounded by a system of lands or ridges 338 which are generally V-shaped in cross section, as shown in FIG. 67.

Figure 54:
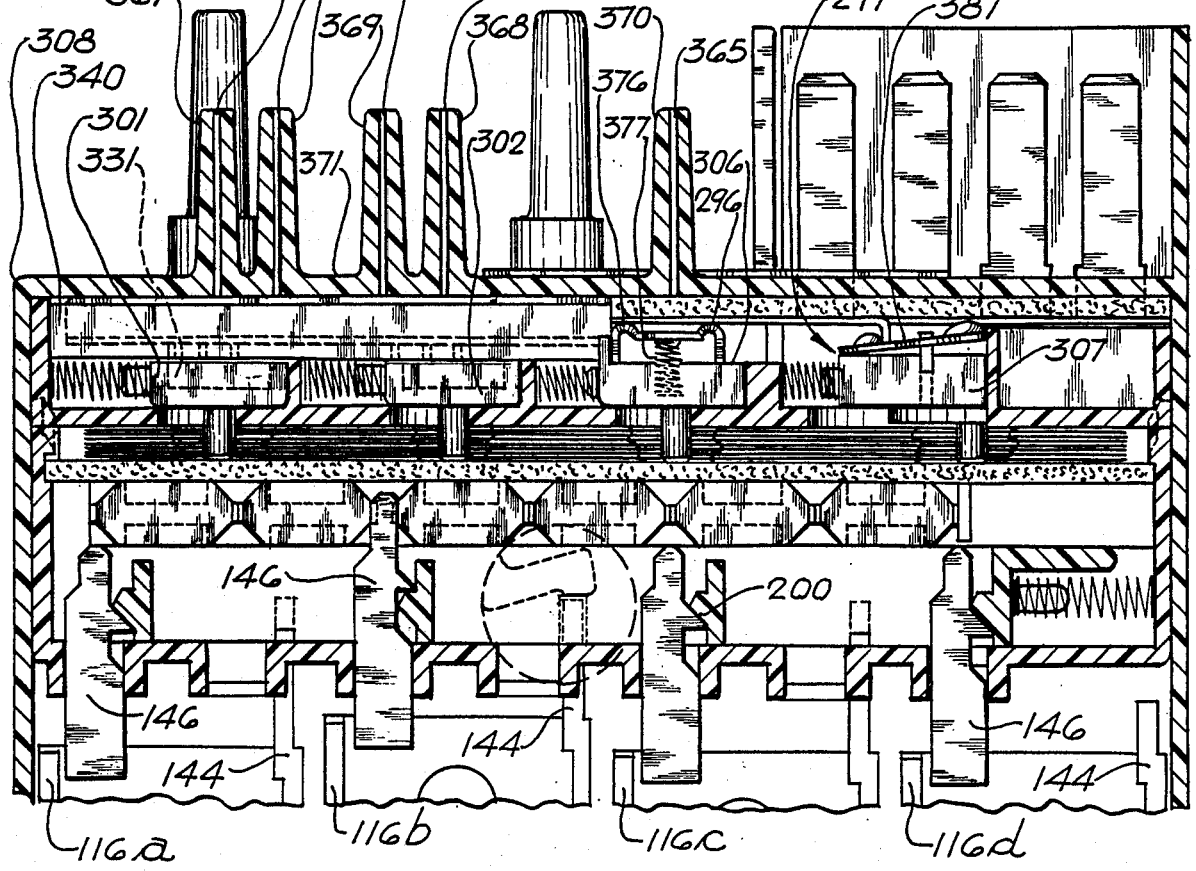
FIG. 54 is a somewhat diagrammatic horizontal section, comprising a rearward extension of FIG. 38, and showing portions of the pushbutton-latching mechanism, the block-out mechanism, the selector plate mechanism, the upper-row vacuum control valves, the air conditioning clutch switch, and the OFF switch.

As shown in FIG. 54, the rubber valve members 331–335, mounted in the valve carriages 301–305, are slidable along a fixed valve plate or member 340, mounted in the rear portion of the housing 308. The valve plate 340 is illustrated separately in FIGS. 86–89, which show that the valve plate 340 has a smooth front surface 341, along which the lands or ridges 338 of the rubber valve members 331–335 are slidable, in sealing engagement with the surface 341. It will be seen that the surface 341 is provided with a pluraltiy of valve ports for cooperating wiht the slidable rubber valve members 331–335. Specifically, the valve surface 341 is formed with valve ports 341a and 341b, for cooperating with the rubber valve member 331; ports 342a and 342b, for cooperating with the rubber valve member 332; ports 343a, 343b and 343c, for cooperating with the rubber valve member 333; ports 344a, 344b and 344c, for cooperating with the rubber valve member 334; and ports 345a, 345b and 345c, for cooperating with the rubber valve member 335.

As illustrated in FIGS. 86–89, the valve plate 340 has a front wall·348 on which the smooth front surface 341 is formed. The valve ports 341a–345c extend through the front wall 348 and open into a hollow space or cavity 349, formed in the rear side of the plate 340, and adapted to receive a two-sided maze or distribution plate 350, for distributing vacuum and atmospheric pressure, to and from the valve ports 341a–345c. The front wall 348 of the valve plate 340 has a smooth rear surface 351, against which the maze plate 350 is engageable. The rubber maze or distribution plate 350 is illustrated separately in FIGS. 90–93, which show that the maze plate 350 has front and rear mazes 352 and 353. When the maze plate 350 is installed in the cavity 349, the front maze 352 is in sealing engagement with the smooth rear surface 351 of the front wall 348. As illustrated, the maze plate 350 has six ports 354, 355, 356, 357, 358 and 359, extending through the plate 350, between the front and rear mazes 352 and 353, so as to establish communication between various portions of the front and rear mazes.

Figure 104:
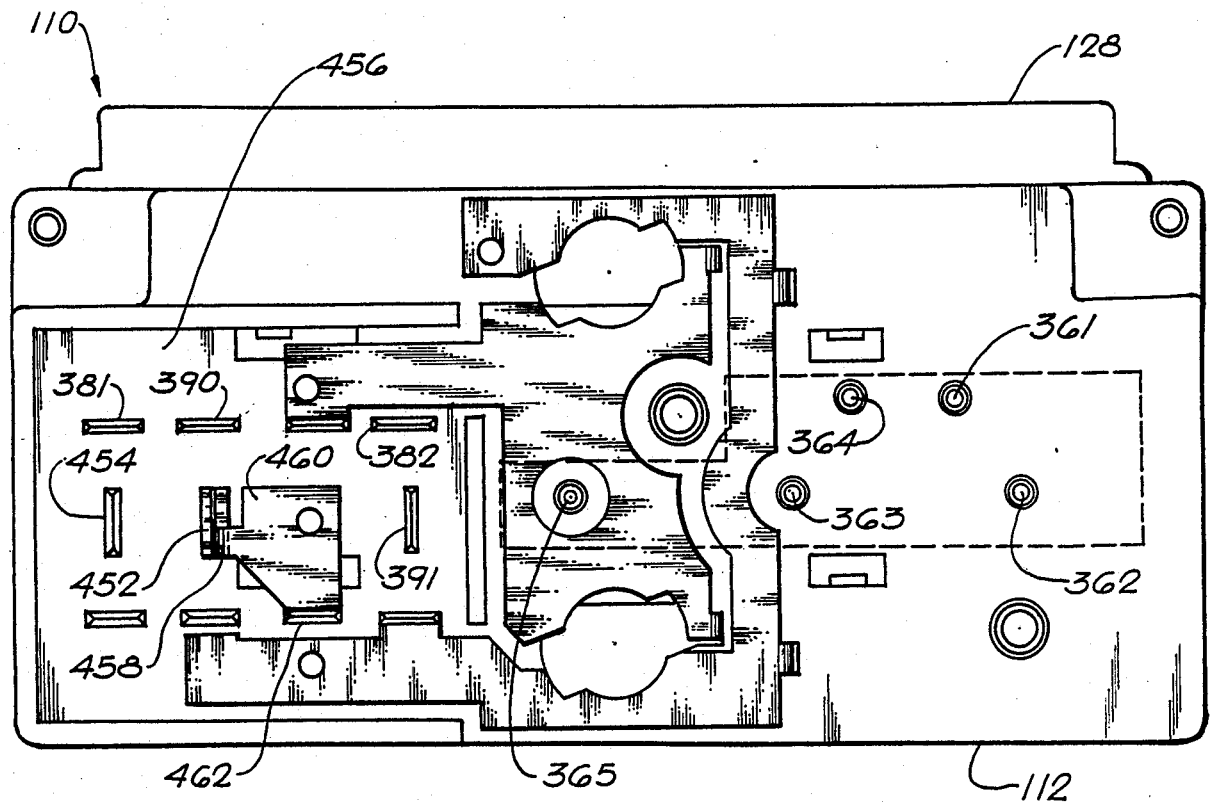
FIG. 104 is an enlarged rear elevational view of the control unit, somewhat similar to FIG. 8, but showing additional details.

FIG. 104 is a rear view of the control unit 110, showing that the main outer housing 112 is formed with five service or access ports 361, 362, 363, 364 and 365, adapted to serve as vacuum inlet and outlet ports. The five ports 361–365 are also illustrated diagrammatically in FIG. 54, showing that the ports extend axially through five corresponding connector nipples 366, 367, 368, 369 and 370, projecting rearwardly from the housing 112, and adapted to receive a vacuum connector, not shown, having hoses extending to the vacuum source and also to various vacuum motors or other utilization devices. The outer housing 112 has a rear wall 371 with a smooth front surface 372, against which the rear maze 353 of the maze plate 350 is pressed into sealing engagement, so that the front and rear mazes 352 and 353 of the rubber maze plate 350 establish vacuum distribution channels between the five service ports 361–365 and the assigned selection of the valve ports 341a–345c. In this way, vacuum and atmospheric pressure are distributed to the various valve ports, in accordance with the desired program, so that the operation of the various valve carriages 301–305 achieves the programmed actuation and deactuation of the vacuum motors or other utilization devices.

As shown in FIGS. 54 and 69, the slidable carriage 306 of the first switch 296 is fitted with a bridging-type contactor 376, biased away from the carriage 306 by a spring 377. Typically, the first switch 296 is employed for controlling the energization of an air conditioning clutch and is initially in an open or OFF condition, so that movement of the switch carriage 306 to the left by any of the selector plates 261–267 closes the switch and energizes the air conditioning clutch.

Figure 83:
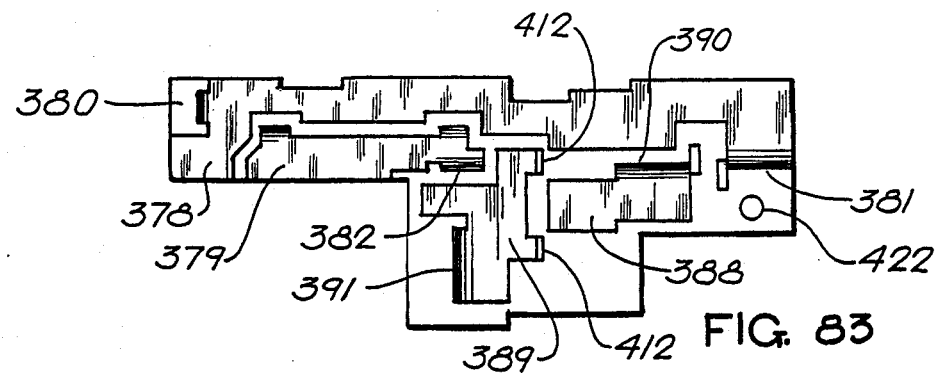
FIG. 83 is a front view showing the fixed electrical contact members and their mounting plate, removed and turned over from the assembly of FIG. 82.
Figure 82:
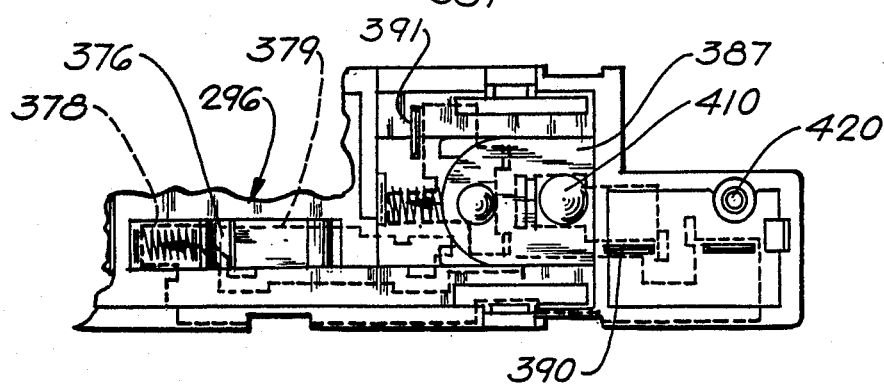
FIG. 82 is a fragmentary rear assembly view, somewhat similar to FIG. 69, but with the fixed electrical contact members shown in phantom.
Figure 85:
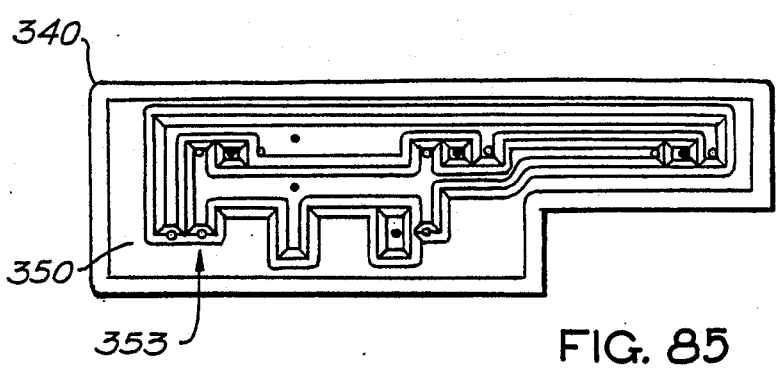
FIG. 85 is a rear view showing the assembly of the plastic valve port member and the rubber maze plate or member, employed to afford communication with the various valve ports.
Figure 84:
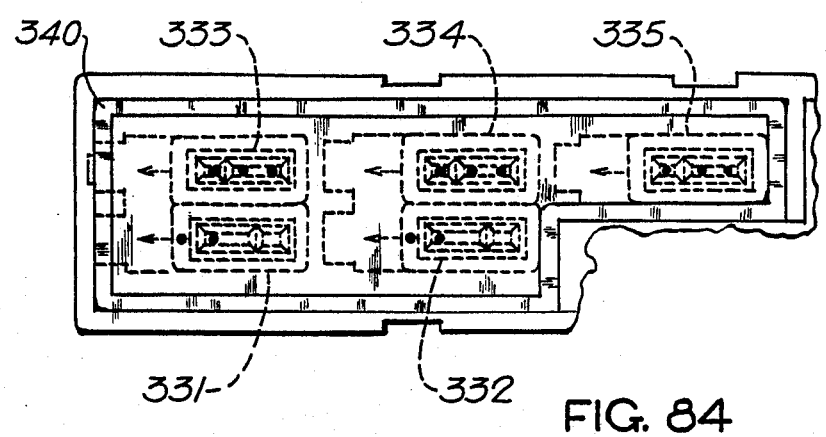
FIG. 84 is a rear assembly view of the valve mechanism, somewhat similar to a portion of FIG. 68, but showing the addition of the valve port member, while showing the valve carriages and valve members in broken lines.

As shown in FIGS. 82 and 83, the first or clutch switch 296 has fixed contacts in the form of conductive metal bars or plates 378 and 379, mounted on the front side of an insulating support in the form of a supporting plate 380, made of a suitable electrically insulating material, such as a resin-impregnated fibrous material. Initially, the contactor 376 engages only the contact plate 379. When the contactor 376 is moved to the left, it also engages the contact plate 378 and forms a bridge between the contact plates 378 adn 379. Rearwardly projecting terminals or prongs 381 and 382 are formed on the contact plates 378 and 379, as shown in FIG. 83, and also in FIGS. 8 and 104, which are rear views of the control unit 110. The terminals 381 and 382, along with other terminals to be described presently, are adapted to receive an electrical connector, not shown, whereby the terminal 381 is adapted to be connected to a wire leading to the air conditioning clutch, while the terminal 382 is adapted to be connected to a wire leading to the ungrounded or plus (+) terminal of the automotive battery. Thus, the movement of the switch contactor 376 into engagement with the fixed contact plate 378 causes energizing battery current to flow to the air conditioning clutch.

Figure 8:
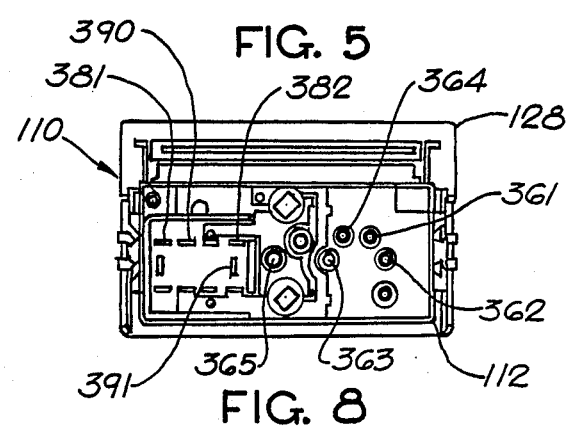
FIG. 8 is a rear elevational view of the control unit, with the heat control mechanism removed.

Typically, the second switch 297 turns OFF the blower of the heating and air conditioning system, so that this switch is referred to as the OFF switch. As shown in FIGS. 54, 69, 82 and 83, the slidable carriage 307 of the switch 297 is fitted with a conductive metal contactor 387 which initially forms a bridge between fixed contacts in the form of conductive metal contact plates 388 and 389, shown in FIGS. 82 and 83. When the switch carriage 307 is moved to the left, against the biasing action of the spring 327, the circuit between the contact plates 388 and 389 is opened by the combined sliding and rocking movement of the contactor 387, as will be described in greater detail presently. The contact plates 388 and 389 are formed with terminals or prongs 390 and 391 which project rearwardly, through and beyond the insulating plate 380, as shown in FIGS. 8, 83 and 104. Like the terminals 381 and 382, the terminals 390 and 391 are adapted to mate with an electrical connector, whereby the terminal 390 is connected to a wire leading to the blower for the heating and air conditioning system, while the terminal 391 is connected to the ungrounded or plus (+) terminal of the battery. Thus, movement of the switch carriage 307 to the left has the effect of turning the blower motor OFF.

The construction and operation of the selector plates 261–267 will now be described in greater detail, with reference to FIGS. 46–52. As previously indicated, the selector plates 261–267 afford programmed actuators whereby the operation of any of the seven pushbuttons 116 and 118 of FIG. 2 may cause actuation of any desired combination of the slidable valve and switch carriages 301–307 of FIGS. 57 and 68. The five valve carriages 301–305 control the interconnection of the input and output ports 361–365 at the rear of the main housing 112. By changing the sizes of the slots and openings in the selector plates 261–267, the interconnection of the inlet and outlet ports 361–365 can be varied, as desired. The ports 361–365 may be connected to various devices, by means of a vacuum connector and a system of hoses. In order to describe a specific example, it will be assumed that the ports 361–365 are connected as follows: the port 361 to the vacuum source; the port 362 to the partial vacuum input of the three-position vacuum motor, whereby the output air is split between the windshield defog outlets and the floor outlets; port 363 to the full vacuum input of the three-position motor, whereby all of the output air is deflected to the floor outlets; the port 364 to the second vacuum motor, whereby the output air is switched to the panel vents, rather than the windshield defog outlets; and port 365 to the third vacuum motor, whereby the inlet of the air duct system is switched to recirculation, rather than outside air.

The valving and switching operations produced by the depression of each of the seven pushbuttons 116 and 118 will now be described. When the OFF pushbutton 116a is depressed, the selector plate 261 is moved to the left, by the engagement of its actuating lever 230 with the smaller slot 271a. As shown in FIG. 46, the plate 261 has a small size valve actuation opening 281a, whereby the knob 311 and the slidable carriage 301 of the first valve 291 are moved to the left, along with the selector plate 261. The operation of the first valve 291 has the effect of connecting the vacuum source port 361 to the ports 362, 363 and 365, so that the first vacuum motor is operated to direct all of the output air to the floor, while the third vacuum motor is operated to cause recirculation of the air. The first selector plate 261 also has a small size opening 281g which causes actuation of the OFF switch 297, as shown in FIG. 106, so that the blower motor is de-energized.

If the FLOOR pushbutton 116b is depressed, the second selector plate 262 is moved to the left, by the engagement of the corresponding lever 230 with the small size slot 272b. As shown in FIG. 47, the selector plate 262 has small size valve-actuating openings 282c and 282d, for causing the slidable carriages 303 and 304 and the operating knobs 313 and 314 of the third and fourth valves 293 and 294 to move to the left. This has the effect of supplying vacuum from the source port 361 to the outlet ports 362 and 363, so that the first vacuum motor is operated to the full position, in which all of the output air is deflected to the floor outlets. The blower motor is energized by the normally closed OFF switch 297. The amount of heat is adjusted by moving the heat regulating knob 134 of FIG. 2.

When the DEF/FLOOR pushbutton 116c is depressed, the third selector plate 263 is moved to the left, by the engagement of the corresponding lever 230 with the small size slot 273c, shown in FIG. 48. It will be seen that the plate 263 has a small size opening 282c, whereby the operating knob 313 and the carriage 303 of the third valve 293 are moved to the left. This has the effect of supplying vacuum from the source port 361 to the outlet port 362, whereby the first vacuum motor is operated to its partial position, whereby the outlet air is split between the windshield defog outlets and the floor outlets. The blower motor is energized through the normally closed OFF switch 297. The amount of heat is determined by adjusting the heat regulating knob 134.

If the DEF pushbutton 116d is depressed, the fourth selector plate 264 is moved to the left, by the engagement of the corresponding lever 230 with the small size slot 274d, shown in FIG. 49. It will be seen that all of the valve control openings 284a–284e are large in size, so that the fourth plate 264 does not operate any of the five valves 291–295. In this situation, the vacuum from the source port 361 is not supplied to any of the outlet ports 362–365. Accordingly, the three vacuum motors are not operated, so that the first vacuum motor deflects all of the outlet air to the windshield defog outlets. The second vacuum motor is not operated, so that all of the air is supplied to the windshield defog outlets, and not to the panel vents. The third vacuum motor is not operated, so that outside air is admitted to the duct system, and there is no recirculation. The blower motor is energized by the normally closed OFF switch 297. The amount of heat is regulated by adjusting the position of the heat regulating knob 134. The vacuum valve condition produced by the depression of the DEF pushbutton 116d is also the default condition, which exists if there is a failure of the source vacuum, or if none of the pushbuttons 116 and 118 is depressed. However, the fourth selector plate 264 also has a small size switch control opening 284f, whereby the operating knob 316 and the carriage 306 of the first switch 296 are moved to the left, so that the air conditioning clutch is energized. Thus cooling and dehumidification of the air is produced by the air conditioning system. This action is of assistance in defogging the windshield, particularly under conditions of high humidity.

If the PANEL VENTS pushbutton 118a is depressed, the fifth selector plate 265 is moved to the left, by the engagement of the corresponding lever 230 with the small size slot 275e. As shown in FIG. 50, the fifth selector plate 265 has a small size valve control opening 285a, whereby the first valve knob 311 and the first valve carriage 301 are moved to the left. This has the effect of supplying vacuum from the source port 361 to the port 364, connected to the second vacuum motor, whereby the output air is switched from the windshield defog outlets to the panel vents. Outside air is thereby supplied to the panel vents. The blower motor is energized through the normally closed OFF switch 297. It is possible to supply a variable amount of heat by adjusting the heat controlknob 134.

If the MAX A/C pushbutton 118b is depressed, the sixth selector plate 266 is moved to the left, by the engagement of the corresponding lever 230 with the small size slot 276f. As shown in FIG. 51, the selector plate 266 has small size valve control openings 286b and 286e, and also a small size switch control opening 286f. The small size valve control openings 286b and 286e cause movement of the actuating knobs 312 and 315 to the left, along with movement of the slidable valve carriages 302 and 305 of the second and fifth valves 292 and 295. The actuation of these valves causes vacuum from the source port 361 to be supplied to the outlet ports 364 and 365, with the result that the second vacuum motor causes all of the output air to be diverted from the windshield defog outlets to the panel vents. In addition, the third vacuum motor closes the supply of outside air and causes recirculation of the inside air through the duct system. The small size switch control opening 286f causes actuating movement of the knob 316 and the switch carriage 306 to the left, so that the switch 296 is closed, whereby the air conditioning clutch is energized. The blower motor is energized by the normally closed blower switch 297.

If the A/C pushbutton 118c is depressed, the seventh selector plate 267 is moved to the left, by the engagement of the corresponding lever 230 with the small size slot 277g. As shown in FIG. 52, the plate 267 has a small size valve control opening 287b and a small size switch control opening 287f. The opening 287b causes movement of the second actuating knob 312 and the second valve carriage 302 to the left, so that the second valve 292 is actuated. This causes vacuum to be supplied from the source port 361 to the outlet port 364, so that the second vacuum motor diverts all of the output air from the windshield defog outlets to the panel vents. Outside air is admitted into the duct system for this operating mode. The small size opening 286f causes actuating movement of the switch knob 316 and the switch carriage 306, so that the switch 296 is closed, to energize the air conditioning clutch. The blower motor is energized by the normally closed OFF switch 297.

It will be understood that the OFF switch 297 is closed at all times, to energize the blower motor, except when the OFF pushbutton 116a is depressed, whereby the switch carriage 307 is moved to the left (FIG. 106), so as to open the normally closed OFF switch 297.

As shown in FIGS. 105-110, the contactor 387 for the OFF switch 297 is in the form of an electrically conductive plate, preferably made of copper or some other suitable conductive metal. The contactor 387 is mounted on the slidable carriage 307, preferably on the rear side thereof, for movement with such carriage, and for rocking movement relative to the carriage, in the manner of a teeter-totter, between the closed or ON position of FIG. 105 and the open or OFF position of FIG. 106.

To afford such rockable support for the contactor 387, the carriage 307 is shown as being fitted with a contactor-supporting member 392 (FIGS. 68, 69, 105, 106, 110) having a rearwardly projecting lug 393, loosely received in a clearance slot 394 (FIG. 107), formed in the contactor plate 387. The supporting member 392 has a pair of rearwardly facing shoulders 395 (FIG. 110), at the opposite ends of the lug 393, for engaging the front side of the contactor plate 387. Due to the loose fit between the lug 393 and the slot 394, the contactor plate 387 is rockable on the shoulders 395. As shown in FIGS. 105 and 106, the contactor-supporting member 392 is mounted on the carriage 307 for rearward and forward sliding movement, relative to the carriage, and is biased rearwardly by resilient biasing means, illustrated as a compression coil spring 396, receivedin an annular rearwardly facing nest 397 (FIGS. 68, 77, 80, 105), formed in the carriage 307. The contactor-supporting member 392 is illustrated in FIGS. 105 and 110 as being in the form of a plate, made of metal or some other suitable material, and slidably received in a slot 398, formed in the carriage 307. The contactor-supporting member 392 is slidable rearwardly and forwardly in the slot 398. The contactor-supporting plate 392 has a pair of arms 400 which are slidable in portions of the slot 398 and are engaged with the coil spring 396, to compress spring into its nest 397. The shoulders 395 are formed onthe rear edges of the arms 400.

The contactor-supporting plate 392 also has a pair of forwardly projecting legs 402 with a keyhole-shaped slot 404 therebetween. The legs 402 are slidable in portions of the slot 398. As shown in FIG. 110, latching teeth 406 are formed on the outer extremities of the legs 402. When the contactor-supporting plate 392 is inserted into the rearward portion of the slot 398 and is moved forwardly, the arms 400 begin to compress the spring 396, and then the latching teeth 406 latch in front of a forward portion 408 of the carriage 307, to retain the plate 392 in its assembled relation with the carriage 307. The contactor plate 387 is then mounted on the supporting plate 392, with the lug 393 received in the slot 394. The contactor plate 387 and the supporting plate 392 can be moved forwardly a substantial additional distance, against the biasing action of the compression spring 396.

As shown in FIGS. 105-109, the contactor 387 is formed with a rounded contact point 410 which is adapted to be slidably engaged with the fixed contact plate 388, when the switch 297 is in its ON or closed position, as shown in FIG. 105. Contact pressure is produced between the contact point 410 and the fixed contact plate 388 by the resilient action of the spring 396, acting upon the supporting plate 392, which in turn acts upon the contactor 387.

As previously mentioned, the contactor plate 387 is rockable about the fulcrum provided by the shoulders 395 of the supporting plate 392, between the ON position of FIG. 105 and the OFF position of FIG. 106. The rocking movement of the contactor 387 is brought about by additional means, slidably engageable with the contactor, such means being illustrated in FIGS. 105 and 106 as a pair of forwardly projecting elements or lugs 412, slidably engageable with the rear surface of the contactor 387, along its marginal portions, so that the lugs 412 are adapted to straddle the locating lug 393 and the contact point 410. As shown in FIGS. 83, 105 and 106, the lugs 412 are bent forwardly from the fixed contact plate 398, so that the lugs 412 also constitute electrical contact elements, for establishing an electrical connection between the contact plate 389 and the contactor 387.

When the OFF switch 297 is in its ON position, as shown in FIG. 105, the coil spring 396 is compressed beyond its initial compression by the engagement of the contact point 410 with the contact plate 388, and by the engagement of the lugs 412 with the contactor 387. Contact pressure is thus produced between the contact point 410 and the stationary contact plate 388, and also between the contactor 387 and the lugs 412.

When the switch 297 is moved to its OFF position, as shown in FIG. 106, the carriage 307 is slid to the left by the actuator plate 261 (FIG. 46), which is one of the seven plates 261-267 of the selector mechanism 268. The plate 261 is actuated by the corresponding lever 230 (FIG. 45), which is operated by the depression of the OFF pushbutton 116a of FIG. 2. As the carriage 307 is slid to the left, the contact point 410 initially slides along the stationary contact plate 388. The contactor plate 387 slides along the lugs 412. When the center of the fulcrum plate 392 passes the lugs 412, the spring force produced by the compression coil spring 396 and applied successively to the slidable fulcrum plate 392 and the contactor 387 and then between the contactor 387 and the lugs 412, causes the contactor to rock suddenly in a clockwise direction, with a snap action, so that the contact point 410 is moved abruptly out of engagement with the stationary contact plate 388, to the OFF position of FIG. 106. Thus, the electrical circuit between the contact point 410 and the contact plate 388 is abruptly interrupted, so as to minimize arcing therebetween. As shown in FIGS. 105-109, the contactor plate 387 has another rounded point 414, projecting rearwardly therefrom, which is engageable with the fixed contact plate 389, when the contactor is in its OFF position, as shown in FIG. 106. The point 414 is near the opposite end of the contactor 387, relative to the position of the contact point 410. The point 414 does not carry any electrical current, but rather acts as a stop element or pad, slidably engageable with the plate 389.

When the switch 297 is allowed to return to its ON position, under the impetus of the return spring 327, the carriage 307 is moved to the right, so that the contactor plate 387 slides along the lugs 412. When the center of the fulcrum plate 392 passes the lugs 412, the spring pressure between the contactor plate 387 and the lugs 412 causes the plate to rock abruptly in a counterclockwise direction, so that the contact point 410 is moved against the fixed contact plate 388 with a snap action, thereby closing the electrical circuit therebetween. There is a sliding movement of the contact point 410 along the contact plate 388, so that good electrical contact is established and maintained. When the OFF switch 297 is moved between its ON position of FIG. 105 and its OFF position of FIG. 106, the abrupt rocking movement of the contactor 387, when the center of the fulcrum plate 392 passes the lugs 412, produces an abrupt interruption of the electrical current between the contact point 410 and the contact plate 388. Moreover, a wide space is rapidly produced between the contact point 410 and the plate 388, to insure that any arc between the point 410 and the plate 388 is rapidly extinguished.

As shown in FIG. 68, the switch carriage 307 is slidably received in a channel 416, formed in the housing 308. The operating knob 317 and a portion of the carriage 307 project forwardly through a slot 418 and are slidable along such slot.

As shown in FIGS. 68 and 69, the housing 308 has a rearwardly projecting pin 420 which is adapted to be received in an opening 422, formed in the electrically insulating supporting plate 380, as shown in FIG. 83, to assist in locating the plate 380. The pin 420 is also shown in FIG. 82. The housing 308 also has latching elements 424 and 426 which assist in locating and retaining the insulating plate 380.

Figure 118:
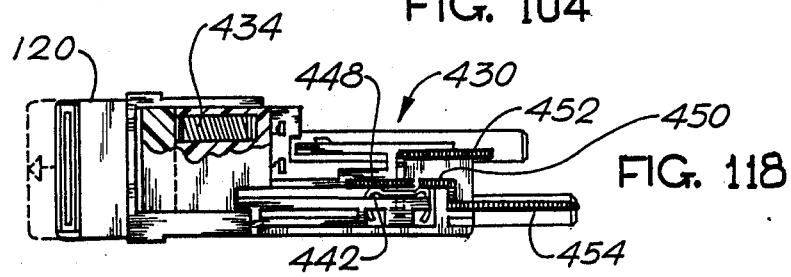
FIGS. 117 and 118 are top views of the rear window defog pushbutton cartridge switch assembly, in its initial and actuated positions, respectively.
Figure 117:
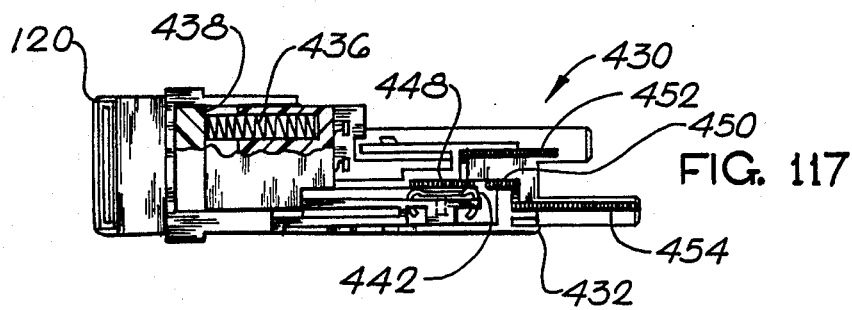
Figure 116:
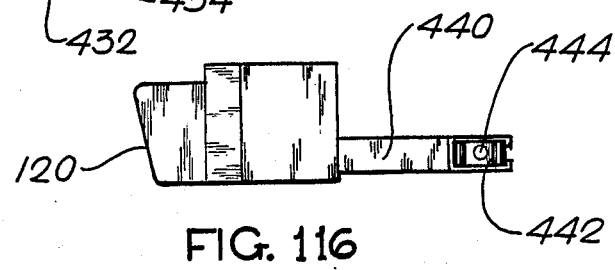
FIG. 116 is an elevation of the rear window defog pushbutton, with its contactor assembled thereon.
Figure 111:
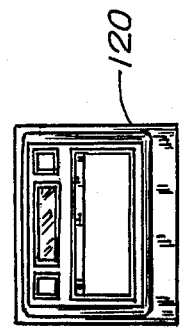
FIGS. 111, 112, 113 and 114 are front, top, bottom and rear views of the rear window defog pushbutton.
Figure 112:
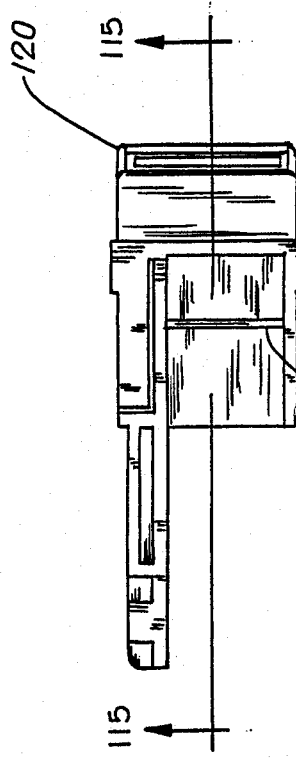
Figure 115:
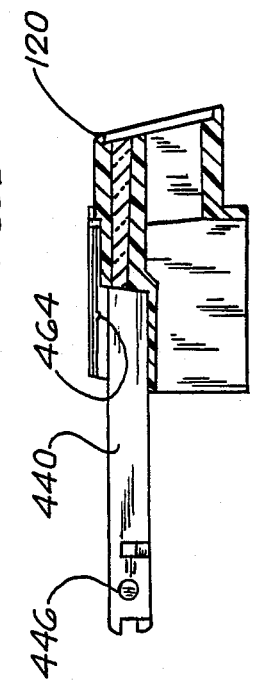
FIG. 115 is a section, taken generally along the line 115—115 in FIG. 112.
Figure 113:
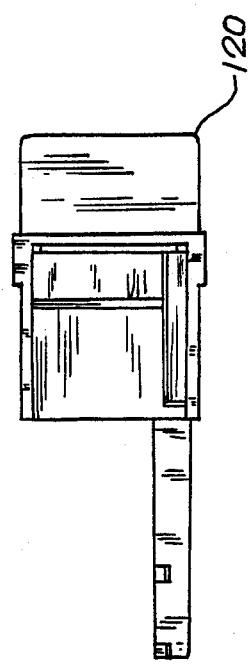
Figure 114:
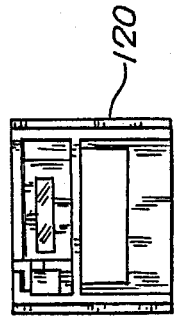

It will be recalled that the eighth pushbutton 120 does not actuate the selector mechanism 268, but rather is employed to operate a separate switch, which may be employed to energize the rear window defogging and defrosting heater, such separate switch being shown as 430 in FIGS. 116-118. Details of the pushbutton 120 are also shown in FIGS. 111-115. The switch 430 is in the form of a pre-assembled cartridge, which may then be inserted as a unit into the housing 114, to facilitate the final assembly of the control unit 110.

The pushbutton 120 is a complex component, preferably molded in one piece of a suitable resinous plastic material. The pushbutton 120 is slidably and telescopically assembled with another component in the form of a switch body 432, as shown in FIGS. 117 and 118. A return spring 434 is provided between the body 432 and the pushbutton 120, to bias the pushbutton forwardly to its extended position, as shown in FIG. 117. The spring 434 is shown in the form of a compression coil spring, received and retained in a nest 436, formed in the body 432. The coil spring 434 engages a shoulder 438 on the pushbutton 120, so that the spring is compressed when the pushbutton is depressed, as shown in FIG. 118.

The pushbutton 120 has a rearwardly projecting finger 440, generally rectangular in cross section, and adapted to serve as a switch carriage for a bridging-type switch contactor 442, as shown in FIGS. 116-118. A compression coil spring 444 is compressed between the contactor 442 and the finger 440, the spring 444 being received and located in a spring nest 446, formed in the finger 440.

The switch body 432 is fitted with stationary electrically conductive contact plates or bars 448 and 450, formed in one piece with respective rearwardly projecting terminals or prongs 452 and 454, made of copper or some other suitable electrically conductive material. When the pushbutton 120 is in its initial, extended position, as shown in FIG. 117, the contactor 442 engages the contact bar 48, but is out of engagement with the contact bar 450, so that there is no electrical connection between the bars 448 adn 450. When the pushbutton 120 is depressed, as shown in FIG. 118, the contactor 442 is slid rearwardly, so that it engages the contact bar 450, as well as the contact bar 448. Thus, the contactor 442 forms a conductive bridge which completes an electrical circuit between the contact bars 448 and 450. Correspondingly, an electrical connection is completed by the contactor 242 between the terminals 452 and 454, which are adapted to be connected into an energizing circuit for the rear window defogging heater.

As shown in FIG. 104, the terminals 452 and 454 are inserted rearwardly through corresponding slots in a rear wall 456 of the main housing 112. The terminal 454 is adapted to be engaged directly by an electrical connector, not shown, whereby the terminal 454 is connected to a wire leading to the energizing circuit for the rear window defogging heater. The terminal 452 is shorter than the terminal 454 and is electrically engaged with a lug 458 on a plate 460 having a rearwardly projecting terminal 462. The plate is made of copper or some other suitable conductive metal and is riveted or otherwise secured to the rear wall 456. The terminal 462 is adapted to be engaged by the same multi-conductor electrical contactor, whereby the terminal 462 is connected to a wire leading to the ungrounded or plus (+) terminal of the automotive battery.

The pushbutton 120 and the switch body 432 preferably have detent means 464 (FIG. 115) for detaining the pushbutton 120 on the switch body 432, as a preliminary matter, prior to the final assembly of the cartridge switch 430 in the main housing 112 of the control unit 110. When the control unit 110 is fully assembled, the pushbutton 120 extends through one of the openings 124 in the front panel 114, and is retained by the front panel.

I claim:

1. A snap-action electrical switch, comprising a movable carriage, means guiding said carriage for movement along a predetermined path between first and second positions, a fixed contact spaced from said carriage along said path, fulcrum means on said carriage, an electrical contactor mounted on said fulcrum means for movement with said carriage and for rocking movement on said fulcrum means, and contactor rocking means for engaging said contactor on one side of said fulcrum means to rock said contactor into electrical engagement with said fixed contact when said carriage is in its first position, the movement of said carriage to said second position causing movement of said contactor relative to said contactor rocking means until said fulcrum means passes said contactor rocking means whereby said contactor is abruptly rocked out of engagement with said fixed contact.

said fulcrum means including a movable fulcrum member and spring means for biasing said fulcrum member and said contactor to afford spring pressure between said contactor and said fixed contact and also between said contactor and said contactor rocking means, said contactor rocking means including an additional fixed electrical contact having lug means slidably engaging said contactor.

2. An electrical switch according to claim 1, in which said fulcrum member includes a locating projection, said contactor having a slot for loosely receiving said projection to retain said contactor on said fulcrum member for rocking movement, said lug means including a pair of lugs for slidably engaging said contactor while straddling said locating projection.

3. An electrical switch according to claim 2, in which said contactor has a contact point for movement into and out of engagement with the first mentioned fixed contact.

4. A snap-action electrical switch, comprising a movable electrically insulating carriage, means guiding the carriage for movement along a predetermined longitudinal path between first and second positions, a first fixed contact spaced laterally from the carriage along the longitudinal path thereof, a fulcrum member, means for mounting the fulcrum member on the carriage for longitudinal movement therewith and for lateral movement relative to the carriage, an electrical contactor mounted on the fulcrum member for longitudinal movement with the carriage and for rocking movement on the fulcrum member, a second electrical contact havig contactor rocking means for slidably engaging the contactor along portions thereof on opposite sides of the fulcrum member relative to the first fixed contact, and spring means for laterally biasing the fulcrum member relative to the carriage, the contactor rocking means being engageable with a portion of the contactor on the remote side of the fulcrum member relative to the first electrical contact to rock the contactor into electrical engagement with the first contact when the carriage is in its first position, the movement of the carriage to the second position causing movement of the contactor relative to the contactor rocking means until the fulcrum member passes the contactor rocking means whereby the contactor is abruptly rocked out of engagement with the fixed contact to afford a snap action.

5. An electrical switch according to claim 4, in which the fulcrum member includes a locating projection, the contactor having a slot therein for loosely receiving the locating projection.

6. An electrical switch according to claim 5, the contactor rocking means including a pair of lugs for slidably engaging the contactor while straddling the locating projection.

7. An electrical switch according to claim 4, the spring means comprising a spring interposed between the carriage and the fulcrum member for laterally biasing the contactor to maintain spring pressure between the contactor and the contactor rocking means while also producing contact pressure between the contactor and the first fixed contact when the contactor is rocked into engagement with the first fixed contact.

8. A snap-action electrical switch, comprising movable electrically insulating carriage, means guiding the carriage for movement along a predetermined longitudinal path between first and second positions, a first fixed contact spaced laterally from the carriage along the longitudinal path thereof, a fulcrum member, means for mounting the fulcrum member on the carriage for longitudinal movement therewith and for lateral movement relative to the carriage, an electrical contactor mounted on the fulcrum member for longitudinal movement with the carriage and for rocking movement on the fulcrum member, the fulcrum member including a locating projection, the contactor having a slot therein for loosely receiving the locating projection, a second electrical contact having contactor rocking means for slidably engaging the contactor along portions thereof on opposite sides of the fulcrum member relative to the first fixed contact, the contactor rocking means including a pair of lugs for slidably engaging the contactor while straddling the locating projection, and a spring interposed between the carriage and the fulcrum member for laterally biasing the contactor to maintain spring pressure between the contactor and the lugs, the lugs being engageable with a portion of the contactor on the remote side of the fulcrum member relative to the first electrical contct to rock the contactor into electrical engagement with the first contact when the carriage is in its first position, the spring producing spring pressure between the contactor and the first contact, the movement of the carriage to the second position causing movement of the contactor relative to the lugs until the fulcrum member passes the lugs whereby the contactor is abruptly rocked out of engagement with the fixed contact to afford a snap action.

* * * * *